(12) United States Patent
Narroschke et al.

(10) Patent No.: US 11,463,731 B2
(45) Date of Patent: Oct. 4, 2022

(54) IMAGE PROCESSING METHOD AND IMAGE PROCESSING APPARATUS

(71) Applicant: Sun Patent Trust, New York, NY (US)

(72) Inventors: Matthias Narroschke, Schaafheim (DE); Thomas Wedi, The Hague (NL)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 17/147,800

(22) Filed: Jan. 13, 2021

(65) Prior Publication Data

US 2021/0136417 A1　May 6, 2021

Related U.S. Application Data

(63) Continuation of application No. 16/710,346, filed on Dec. 11, 2019, now Pat. No. 10,924,764, which is a
(Continued)

(51) Int. Cl.
*H04N 19/61* (2014.01)
*H04N 19/117* (2014.01)
(Continued)

(52) U.S. Cl.
CPC ........... *H04N 19/61* (2014.11); *H04N 19/117* (2014.11); *H04N 19/139* (2014.11);
(Continued)

(58) Field of Classification Search
CPC .... H04N 19/61; H04N 19/117; H04N 19/139; H04N 19/159; H04N 19/176; H04N 19/82; H04N 19/86
See application file for complete search history.

(56) References Cited

U.S. PATENT DOCUMENTS 7,167,522 B2　1/2007　Webb
7,907,789 B2　3/2011　Yong
(Continued)

FOREIGN PATENT DOCUMENTS

CN　　102098501　　6/2011
JP　　2004-180248　　6/2004

OTHER PUBLICATIONS

JCT-VC, "WD3: Working Draft 3 of High-Efficiency Video Coding", JCTVC-E603, 8.6.1., Mar. 2011.
(Continued)

*Primary Examiner* — Joseph W Becker
(74) *Attorney, Agent, or Firm* — Wenderoth, Lind & Ponack, L.L.P.

(57) ABSTRACT

An image processing method of performing filtering on image blocks using a plurality of deblocking filters having different filter strengths includes: a first parameter calculating step of calculating a first parameter indicating a boundary strength; a second parameter calculating step of calculating a second parameter indicating a limit value for each of the deblocking filters, based on the first parameter and a quantization parameter; and a selecting step of selecting a deblocking filter to be used in the filtering from among the deblocking filters, using one or more threshold values which are determined based on the second parameter.

2 Claims, 41 Drawing Sheets

Related U.S. Application Data continuation of application No. 15/010,499, filed on Jan. 29, 2016, now Pat. No. 10,587,895, which is a continuation of application No. 13/683,093, filed on Nov. 21, 2012, now Pat. No. 9,414,064.

(60) Provisional application No. 61/563,695, filed on Nov. 24, 2011.

(51) Int. Cl.
  *H04N 19/86*  (2014.01)
  *H04N 19/139* (2014.01)
  *H04N 19/159* (2014.01)
  *H04N 19/176* (2014.01)
  *H04N 19/82*  (2014.01)

(52) U.S. Cl.
  CPC ......... *H04N 19/159* (2014.11); *H04N 19/176* (2014.11); *H04N 19/82* (2014.11); *H04N 19/86* (2014.11)

(56) References Cited

U.S. PATENT DOCUMENTS

| | | |
|---|---|---|
| 8,599,935 B2 | 12/2013 | Kawashima |
| 2004/0062310 A1 | 4/2004 | Xue et al. |
| 2004/0076237 A1 | 4/2004 | Kadono et al. |
| 2004/0184549 A1 | 9/2004 | Webb |
| 2006/0126962 A1 | 6/2006 | Sun |
| 2006/0239360 A1 | 10/2006 | Kadono et al. |
| 2007/0092002 A1 | 4/2007 | Xue et al. |
| 2007/0098066 A1 | 5/2007 | Xue et al. |
| 2007/0104269 A1 | 5/2007 | Xue et al. |
| 2008/0025632 A1 | 1/2008 | Bjontegaard |
| 2008/0049843 A1 | 2/2008 | Kadono et al. |
| 2008/0056353 A1 | 3/2008 | Xue et al. |
| 2008/0056602 A1 | 3/2008 | Xue et al. |
| 2008/0056603 A1 | 3/2008 | Xue et al. |
| 2008/0063084 A1 | 3/2008 | Xue et al. |
| 2008/0069245 A1 | 3/2008 | Kadono et al. |
| 2008/0130761 A1 | 6/2008 | Kadono et al. |
| 2008/0165863 A1 | 7/2008 | Yan |
| 2009/0207911 A1 | 8/2009 | Minamoto |
| 2010/0027686 A1 | 2/2010 | Zuo |
| 2011/0103488 A1 | 5/2011 | Xue et al. |
| 2011/0116549 A1 | 5/2011 | Sun |
| 2011/0222607 A1* | 9/2011 | An .................. H04N 19/102 375/240.24 |
| 2012/0314775 A1 | 12/2012 | Laksono et al. |
| 2013/0195207 A1 | 8/2013 | Xue et al. |
| 2015/0195535 A1 | 7/2015 | Xue et al. |
| 2015/0195579 A1 | 7/2015 | Xue et al. |
| 2015/0201194 A1 | 7/2015 | Xue et al. |
| 2015/0281731 A1 | 10/2015 | Kadono et al. |
| 2017/0134757 A1 | 5/2017 | Xue et al. |

OTHER PUBLICATIONS

JCT-VC, "Common test conditions and software reference configurations", JCTVC-F900, Jul. 2011.

JCT-VC, "WD4: Working Draft 4 of High-Efficiency Video Coding", JCTVC-F803_d2, Jul. 2011.

International Search Report issued Feb. 26, 2013 in corresponding International Application No. PCT/JP2012/007473.

Jungyoup Yang et al., "CE12: SK Telecom/SKKU Deblocking Filter", Joint Collaborative Team on Video Coding (JCT-VC) of ITU-T SG16 WP3 and ISO/IEC JTC1/SC29/WG11 6th Meeting: Torino, IT, Jul. 14, 2011, [JCTVC-F258].

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d6, Ver.7, 6th Meeting: Torino, IT, Jul. 14-22, 2011.

Mangesh Sadafale, "Improving Deblocking filter efficiency", Joint Collaborative Team on Video Coding (JCT-VC) of ITU-T SG16 WP3 and ISO/IEC JTC1/SC29/WG11 $6^{th}$ Meeting: Torino, Jul. 14-22, 2011, JCTVC-F256, pp. 1-10, URL, http://wftp3.itu.int/av-arch/jctvc-site/2011_07_F_Torino/.

Office Action dated Apr. 25, 2014 in U.S. Appl. No. 14/013,676.

Office Action dated Aug. 12, 2014 in U.S. Appl. No. 14/013,676.

Extended European Search Report dated Mar. 16, 2015 in corresponding European Application No. 12852002.0.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, $5^{th}$ Meeting: Geneva, CH, Mar. 16-23, 2011, Document: JCTVC-E603, Mar. 30, 2011, XP030009014.

Jungyoup Yang et al., "CE12: SK Telecom/SKKU Deblocking Filter", Joint Collaborative Team on Video Coding (JCT-VC) of ITU-T SG16 WP3 and ISO/IEC JTC1/SC29/WG11, $6^{th}$ Meeting: Torino, IT, Jul. 14-22, 2011, Document: JCTVC-F258, Jul. 18, 2011, XP030049241.

Geert Van Der Auwera et al., "Non-CE12 Subtest 5: Transform Dependent Deblocking Filter Parameter Adjustment in Slice Level", Joint Collaborative Team on Video Coding (JCT-VC) of ITU-T SG16 WP3 and ISO/IEC JTC1/SC29/WG11, $7^{th}$ Meeting: Geneva, CH, Nov. 21-30, 2011, Document: JCTVC-G291, Nov. 18, 2011, XP030050416.

Peter List et al., "Adaptive Deblocking Filter", IEEE Transactions on Circuits and Systems for Video Technology, IEEE Service Center, Piscataway, NJ, US, vol. 13, No. 7, Jul. 1, 2003, pp. 614-619, XP011221094.

Gary J. Sullivan et al., "Overview of the High Efficiency Video Coding (HEVC) Standard", IEEE Transactions on Circuits and Systems for Video Technology, Jan. 1, 2012, XP055045358.

Office Action dated Jul. 18, 2017 in U.S. Appl. No. 15/010,546.

Benjamin Bross et al., WD4: Working Draft 4 of High-Efficiency Video Coding [online], JCTVC-F803_d6, Internet<URL:http://phenix.it-sudparis.eu/jct/doc_end_user/documents/6_Torino/wg11/JCTVC-F803-v8.zip>, Jul. 2011, pp. 131-142.

Sakae Okubo et al., "Third edition, H.264/AVC Text Book", An Impress Group Company, Jan. 1, 2009, First Edition, pp. 144-148 (with partial English translation).

Office Action and Search Report dated Apr. 1, 2020 in corresponding Chinese Patent Application No. 201810244505.0, with English Translation of Search Report.

\* cited by examiner

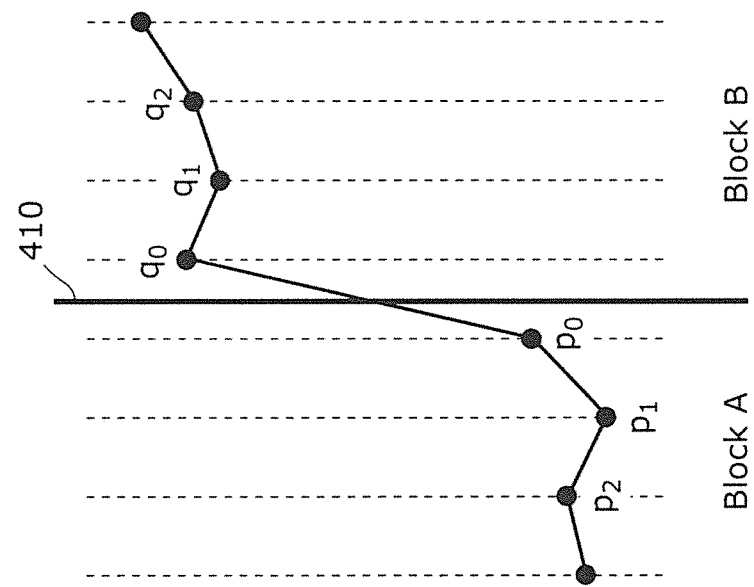

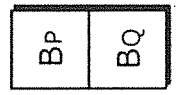
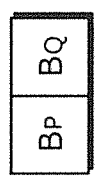
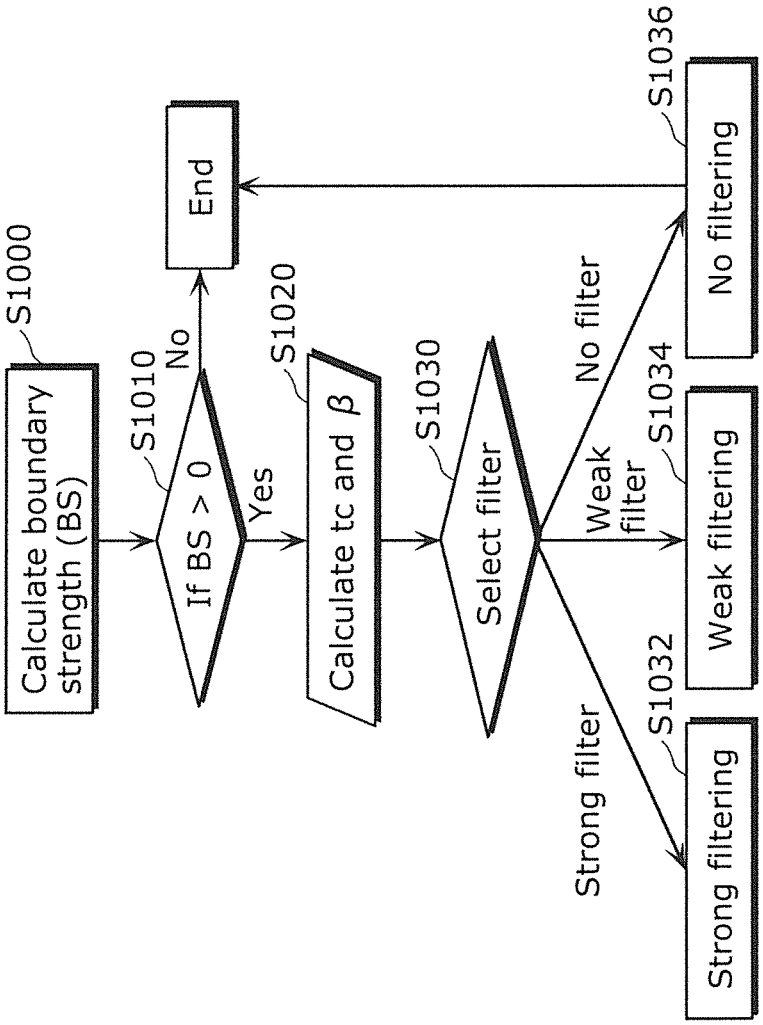

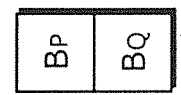
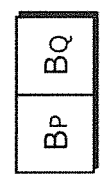
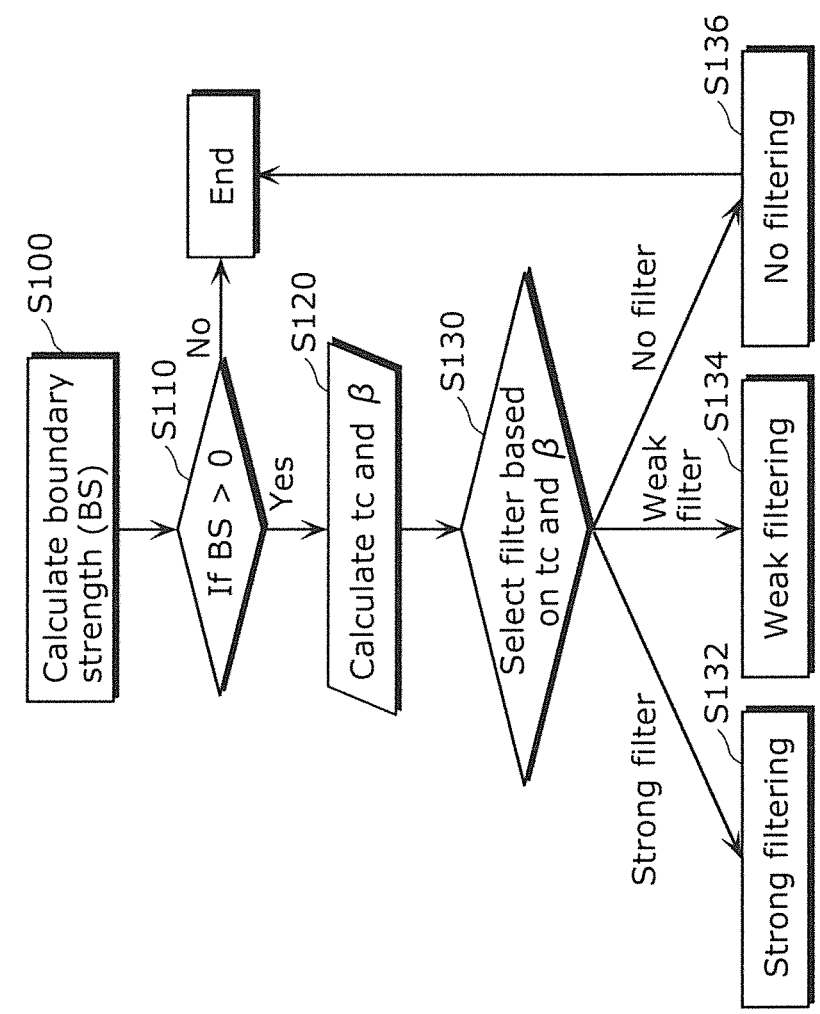

FIG. 12A

|  | All Intra HE ||| All Intra LC |||
|---|---|---|---|---|---|---|
|  | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
|  | 0.0% | 0.0% | 0.0% | 0.0% | 0.0% | 0.0% |

|  | Random Access HE ||| Random Access LC |||
|---|---|---|---|---|---|---|
|  | Y | U | V | Y | U | V |
| Class A | 0.0% | -0.2% | -0.1% | 0.0% | 0.1% | -0.1% |
| Class B | 0.0% | 0.1% | 0.2% | 0.0% | -0.2% | 0.1% |
| Class C | 0.0% | 0.0% | -0.1% | 0.0% | -0.2% | -0.2% |
| Class D | -0.1% | 0.3% | -0.1% | 0.0% | 0.0% | 0.2% |
| Class E |  |  |  |  |  |  |
| Overall | 0.0% | 0.1% | 0.0% | 0.0% | -0.1% | 0.0% |
|  | 0.0% | 0.1% | 0.0% | 0.0% | -0.1% | 0.0% |

|  | Low delay B HE ||| Low delay B LC |||
|---|---|---|---|---|---|---|
|  | Y | U | V | Y | U | V |
| Class A |  |  |  |  |  |  |
| Class B | 0.0% | 0.1% | 0.2% | 0.0% | 0.1% | 0.0% |
| Class C | 0.0% | -0.2% | -0.2% | 0.0% | 0.1% | 0.0% |
| Class D | 0.0% | 0.1% | -0.2% | -0.1% | 0.4% | -0.1% |
| Class E | -0.1% | 0.1% | -0.1% | 0.0% | -0.1% | 0.0% |
| Overall | 0.0% | 0.0% | 0.0% | 0.0% | 0.0% | 0.0% |

|  | Low delay P HE ||| Low delay P LC |||
|---|---|---|---|---|---|---|
|  | Y | U | V | Y | U | V |
| Class A |  |  |  |  |  |  |
| Class B | -0.1% | -0.1% | 0.0% | -0.1% | 0.1% | 0.0% |
| Class C | 0.0% | -0.2% | 0.0% | 0.0% | 0.0% | -0.1% |
| Class D | 0.0% | 0.0% | 0.2% | 0.0% | -0.4% | 0.0% |
| Class E | -0.3% | -0.6% | -0.5% | -0.2% | 0.0% | 0.2% |
| Overall | -0.1% | -0.2% | 0.0% | -0.1% | -0.1% | 0.0% |

Reference: HM-4.0_Reference
Tested: HM-4.0_Modify_Boundary_Strength

FIG. 12B

|  | Random Access HE | | | Random Access LC | | |
|---|---|---|---|---|---|---|
|  | Y | U | V | Y | U | V |
| Class A | 0.0% | 0.4% | 0.1% | 0.0% | 0.0% | 0.1% |
| Class B | 0.0% | -0.3% | 0.5% | 0.0% | 0.0% | -0.2% |
| Class C | 0.1% | -0.2% | -0.3% | -0.1% | -0.3% | 0.3% |
| Class D | 0.0% | 0.2% | -0.1% | -0.2% | 1.3% | 0.5% |
| Class E |  |  |  |  |  |  |
| Overall | 0.0% | 0.0% | 0.1% | -0.1% | 0.2% | 0.2% |
|  | 0.0% | 4.6% | 36.1% | -0.1% | -4.0% | 0.8% |

|  | Low delay B HE | | | Low delay B LC | | |
|---|---|---|---|---|---|---|
|  | Y | U | V | Y | U | V |
| Class A |  |  |  |  |  |  |
| Class B | 0.0% | 0.0% | -0.8% | -0.2% | 0.1% | -0.1% |
| Class C | 0.0% | 0.0% | 0.4% | 0.1% | 0.4% | -0.5% |
| Class D | -0.1% | 0.6% | -0.8% | -0.1% | 1.1% | 1.4% |
| Class E | -0.1% | 0.9% | 0.3% | 0.0% | 0.5% | -0.3% |
| Overall | 0.0% | 0.3% | -0.3% | -0.1% | 0.5% | 0.1% |
|  | 0.0% | 2.4% | -1.3% | -0.1% | 0.9% | 0.2% |

|  | Low delay P HE | | | Low delay P LC | | |
|---|---|---|---|---|---|---|
|  | Y | U | V | Y | U | V |
| Class A |  |  |  |  |  |  |
| Class B | 0.0% | 0.2% | -0.2% | -0.1% | 0.8% | -0.1% |
| Class C | 0.2% | -0.4% | -0.5% | -0.1% | -0.2% | 0.3% |
| Class D | 0.0% | -1.0% | 0.1% | -0.1% | 0.9% | 0.2% |
| Class E | 0.1% | 0.3% | 0.3% | 0.0% | 0.7% | 0.5% |
| Overall | 0.1% | -0.2% | -0.1% | -0.1% | 0.5% | 0.2% |
|  | 0.1% | 0.2% | 0.2% | -0.1% | 0.9% | 0.4% |

Reference: HM-4.0_Reference
Tested:    HM-4.0_Modify_Boundary_Strength_Higher QPs[39,41,43,45]

FIG. 14

|  | All Intra HE | | | All Intra LC | | |
|---|---|---|---|---|---|---|
|  | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
|  | 0.0% | 0.0% | 0.0% | 0.0% | 0.0% | 0.0% |

|  | Random Access HE | | | Random Access LC | | |
|---|---|---|---|---|---|---|
|  | Y | U | V | Y | U | V |
| Class A | 0.0% | 0.0% | 0.0% | 0.0% | 0.0% | 0.0% |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E |  |  |  |  |  |  |
| Overall | 0.0% | 0.0% | 0.0% | 0.0% | 0.0% | 0.0% |
|  | 0.0% | 0.0% | 0.0% | 0.0% | 0.0% | 0.0% |

|  | Low delay B HE | | | Low delay B LC | | |
|---|---|---|---|---|---|---|
|  | Y | U | V | Y | U | V |
| Class A |  |  |  |  |  |  |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
|  | 0.0% | 0.0% | 0.0% | 0.0% | 0.0% | 0.0% |

|  | Low delay P HE | | | Low delay P LC | | |
|---|---|---|---|---|---|---|
|  | Y | U | V | Y | U | V |
| Class A |  |  |  |  |  |  |
| Class B | 0.0% | 0.0% | 0.0% | 0.0% | 0.0% | 0.0% |
| Class C | 0.0% | 0.0% | 0.0% | 0.0% | 0.0% | 0.0% |
| Class D | 0.0% | 0.0% | 0.0% | 0.0% | 0.0% | 0.0% |
| Class E | 0.0% | 0.0% | 0.0% | 0.0% | 0.0% | 0.0% |
| Overall | 0.0% | 0.0% | 0.0% | 0.0% | 0.0% | 0.0% |
|  | 0.0% | 0.0% | 0.0% | 0.0% | 0.0% | 0.0% |

Reference: HM-4.0
Tested: HM-4.0_BS_simplify
49 frames
Note: BD-rate is computed using piece-wise cubic interpolation
Shaded numbers using cubic interpolation

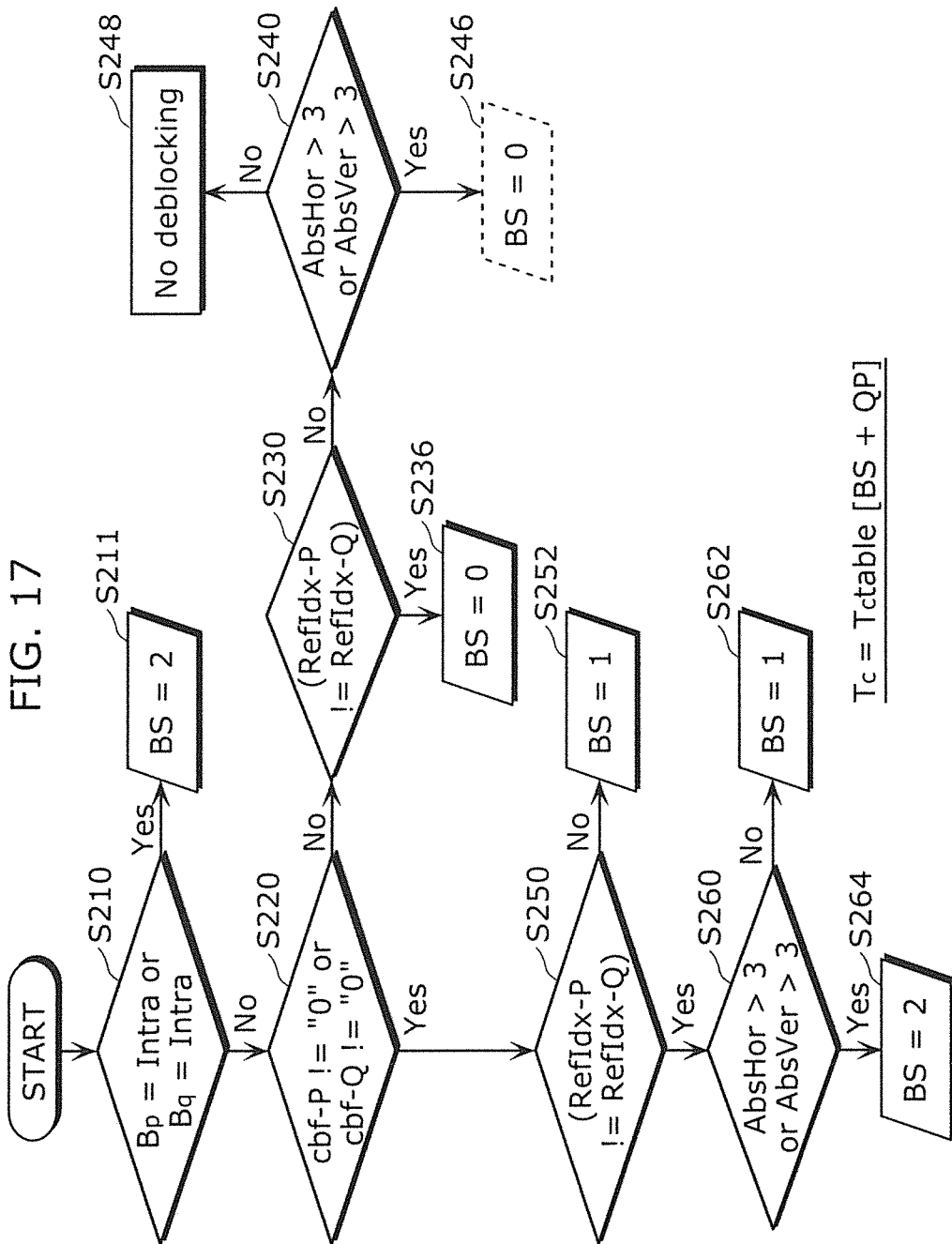

FIG. 30
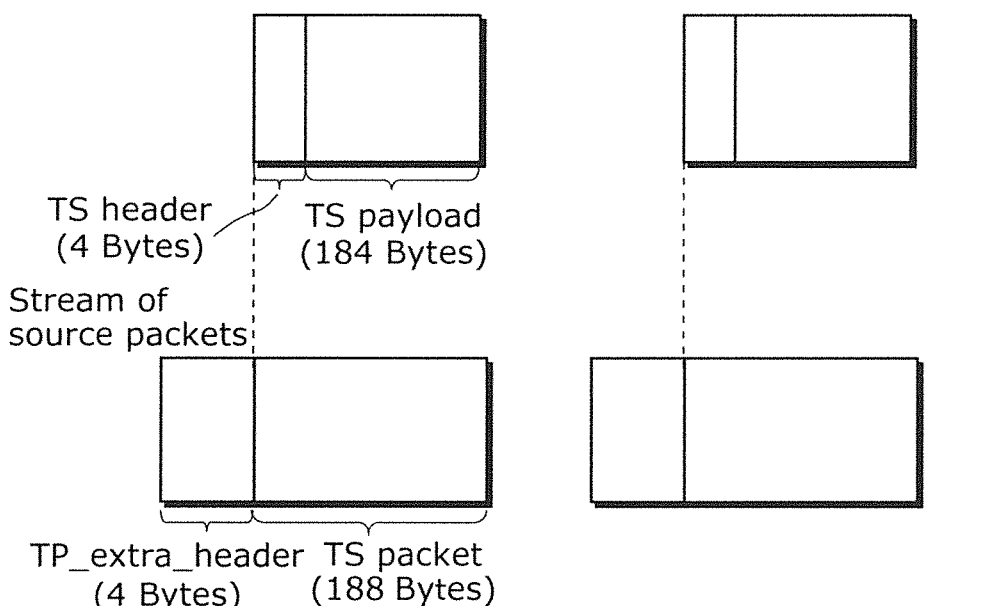
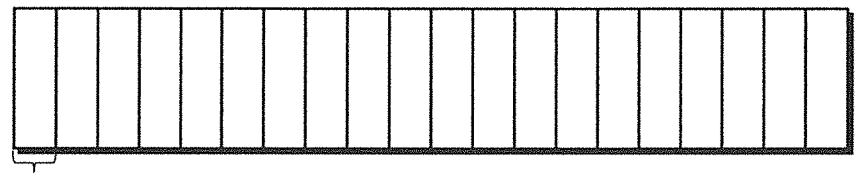

Data structure of PMT

FIG. 38

| Corresponding standard | Driving frequency |
|---|---|
| MPEG-4 AVC | 500 MHz |
| MPEG-2 | 350 MHz |
| ⋮ | ⋮ |

IMAGE PROCESSING METHOD AND IMAGE PROCESSING APPARATUS

CROSS REFERENCE TO RELATED APPLICATIONS

The present application is a continuation of U.S. application Ser. No. 16/710,346, filed Dec. 11, 2019, which is a continuation of U.S. application Ser. No. 15/010,499, filed Jan. 29, 2016, now U.S. Pat. No. 10,587,895, which is a continuation of U.S. application Ser. No. 13/683,093, filed Nov. 21, 2012, now U.S. Pat. No. 9,414,064, which claims the benefit of U.S. Provisional Patent Application No. 61/563,695 filed on Nov. 25, 2011. The entire disclosures of the above-identified applications, including the specification, drawings and claims are incorporated herein by reference in their entirety.

FIELD

The present disclosure relates to an image processing method and an image processing apparatus for filtering images using deblocking filters.

BACKGROUND

For video coding processes, several standards have been standardized. At present, most of standardized video coding processes are performed using hybrid video coding processes. In the hybrid video coding, reversible compression and irreversible compression are generally combined in order to obtain a desirable compression gain. Hybrid video coding is the basis for ITU-T standards (H.26x standards such as H.261 and H.263) as well as ISO/IEC standards (MPEG-X standards such as MPEG-1, MPEG-2, and MPET-4).

A video coding apparatus which executes hybrid video coding receives, as an input, a video signal representing an image sequence including a sequence of frames. In the hybrid video coding, each of the input images (frames) is divided into a plurality of blocks, and the image is coded on a per divided block basis. Among the divided blocks, the block having the largest size is referred to as a largest coding unit (LCU). For example in HEVC, the size of the largest coding unit LCU is 64×64 pixels. In addition, in H.264/MPEG-4 AVC, the LCU is further divided into coding units (CU) each having 16×16 pixels or so, and the image is coded on a per CU basis. In addition, the coding unit CU may be further divided into prediction units (PU) or transform units (TU) each having a smaller size. It is to be noted that the sizes of such blocks may vary depending on the kinds of the content of images. In addition, the coding schemes may vary depending on the blocks.

Since coding is executed on a per block basis as described above, when a coded bitstream is decoded, an image decoded therefrom may have a noticeable block boundary (a block noise). A significantly noticeable block noise appears when rough quantization is performed in a quantization process. Such a block noise adversely affects human visual recognition. In short, a block noise decreases image quality.

An exemplary method for reducing block noises is a method for filtering using a deblocking filter in the H.264/MPEG-4 AVC video coding standard or HM (HM is an HEVC test model in the trend report on video coding standardization, see Non-patent Literature 3). A deblocking filter is used for a reconstructed image to be referred to in a prediction process.

CITATION LIST

Patent Literature

[PTL 1]
United States Patent Application Publication No. 2008/0025632, Specification

Non Patent Literature

[NPL 1]
JCT-VC, "WD3: Working Draft 3 of High-Efficiency Video Coding", JCTVC-E603, March 2011, Section 8.6.1
[NPL 2]
JCT-VC, "Common test conditions and software reference configurations", JCTVC-F900, July 2011
[NPL 3]
JCT-VC, "WD4:Working Draft 4 of High-Efficiency Video Coding", JCTVC-F803_d2, July 2011

SUMMARY

Technical Problem

In the aforementioned conventional technique, block noises are reduced in the filtering processes using deblocking filters.

The present disclosure is provided with an aim to provide an image processing method and an image processing apparatus for performing, using deblocking filters, filtering processes more suitably adapted to reduce such block noises.

Solution to Problem

In order to achieve the aforementioned aim, an image processing method according to an aspect of the present disclosure is an image processing method of performing filtering on image blocks using a plurality of deblocking filters having different filter strengths, and the image processing method includes: a first parameter calculating step of calculating a first parameter indicating a boundary strength between two adjacent image blocks; a second parameter calculating step of calculating a second parameter indicating a limit value for each of the deblocking filters, based on the first parameter and a quantization parameter; and a selecting step of selecting a deblocking filter to be used in the filtering from among the deblocking filters, using one or more threshold values which are determined based on the second parameter.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to the present disclosure, it is possible to realize an image processing method using deblocking filters and an image processing apparatus including deblocking filters more suitably adapted to such block noises.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3A is a diagram showing exemplary pixel values of pixels in the two coding block units CU adjacent to each other in the horizontal direction.

FIG. 3B is a diagram specifically showing an adjacent block A and a target block B shown in FIG. 2A.

FIG. 4A is a diagram showing a processing procedure of steps of filtering in a comparison example.

FIG. 4B is a diagram showing two blocks adjacent to each other in a horizontal direction.

FIG. 4C is a diagram showing two blocks adjacent to each other in a vertical direction.

FIG. 7A is a diagram showing processing procedures of steps of filtering in the embodiments.

FIG. 7B is a diagram showing two blocks adjacent to each other in a horizontal direction.

FIG. 7C is a diagram showing two blocks adjacent to each other in a vertical direction.

FIG. 12A is a diagram showing coding efficiencies in the comparison example and coding efficiencies in the embodiments.

FIG. 12B is a diagram showing coding efficiencies in the comparison example and coding efficiencies in the embodiments.

FIG. 14 is a diagram showing coding efficiencies in the comparison example and coding efficiencies in the embodiments.

FIG. 17 is a diagram showing an exemplary set threshold value $t_c$ in Variation 3.

FIG. 30 shows a structure of TS packets and source packets in the multiplexed data.

FIG. 38 is associated with driving frequencies.

DESCRIPTION OF EMBODIMENTS (Underlying Knowledge Forming Basis of the Present Disclosure/Details of Problems in the Present Disclosure)

In general, in hybrid video coding, a moving picture coding apparatus executes a prediction process to generate a prediction image data, and executes at least one of a transform process and a quantization process on a residual image data which is a difference between an input image data and the prediction image data. In the prediction process, spatial prediction or temporal prediction is generally used. In the spatial prediction, a spatially close block among already coded blocks is used for the prediction. In the temporal prediction, a temporally close block among already coded blocks is used for the prediction. In the transform process, the prediction residual data (prediction residual block) is transformed from a spatial (pixel) domain to a frequency domain, resulting in transform coefficients. This transform is performed with an aim to reduce correlation between input blocks. In the quantization process, the transform coefficients are quantized to generate quantized coefficients. This quantization is performed using irreversible compression. In general, the moving picture coding apparatus performs entropy coding on the quantized coefficients to further compress (reversibly compress) the compressed quantized coefficients, to generate a coded video signal. Furthermore, the moving picture coding apparatus codes decoding control information necessary for decoding a coded bitstream. This decoding control information is, for example, information related to spatial prediction and/or temporal prediction, the amount of quantization, and so on. The moving picture coding apparatus generates the coded bitstream including the coded video signal and the decoding control information.

[Structure of Moving Picture Coding Apparatus in Comparison Example]

Figure 1:
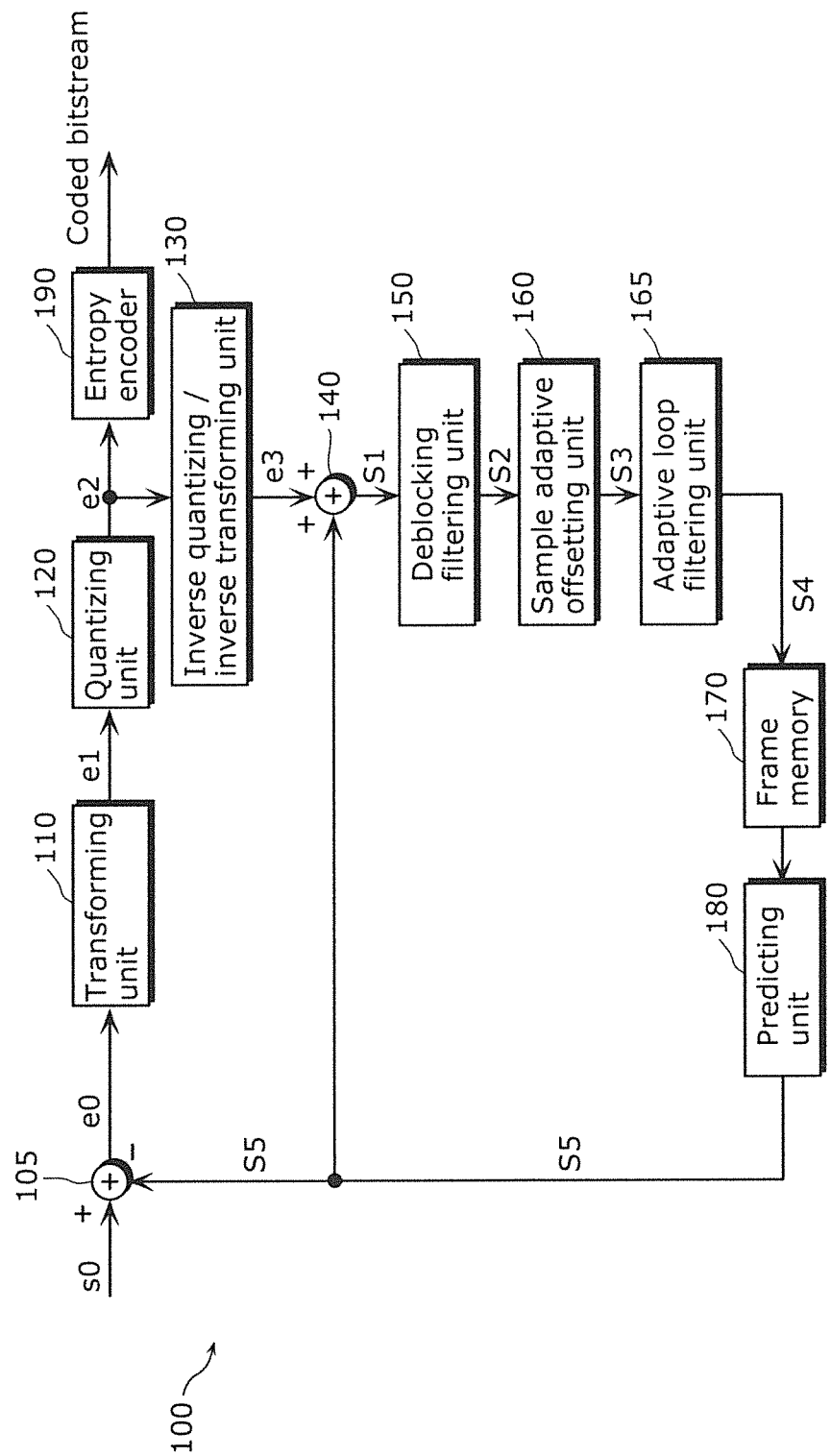
FIG. 1 is a block diagram showing an exemplary structure of a moving picture coding apparatus according to Embodiment 1.

FIG. 1 is a block diagram showing an exemplary structure of a moving picture coding apparatus which supports the H.264/MPEG AVC or HEVC.

As shown in FIG. 1, the moving picture coding apparatus 100 includes a subtractor 105, a transforming unit 110, a quantizing unit 120, an inverse quantizing/inverse transforming unit 130, an adder 140, a deblocking filtering unit 150, a sample adaptive offsetting unit 155, an adaptive loop filtering unit 165, a frame memory 170, a predicting unit 180, and an entropy encoder 190.

In FIG. 1, the subtractor 105 generates, for each block, prediction error data (a prediction error signal e0) by subtracting prediction image data (a prediction image signal s5) corresponding to a current block to be coded from input image data of a current block to be coded included in an input signal s0.

The transforming unit 110 transforms the generated prediction error data (prediction error signal e0) from an image domain to a frequency domain.

The quantizing unit 120 performs a quantization process on the prediction error data (prediction error signal e1) transformed to the frequency domain, to calculate quantized coefficients. Here, the quantizing unit 120 transforms the prediction error data using two-dimensional discrete cosine transform (DCT). The quantized coefficients calculated using DCT tends to be low frequency components. It is to be noted that the quantizing unit 120 may transform the prediction error data using integer transform or the like.

The inverse quantizing/inverse transforming unit 130 performs inverse quantization on the prediction error data (prediction error signal e2) quantized by the quantizing unit 120, and further performs inverse transform for transform from the frequency domain to the image domain. It is to be noted that the prediction error signal e3 is different from the original prediction error signal e0 due to the influence of a quantization error also called as a quantization noise which occurs in the quantization process.

The adder 140 generates a reconstructed image data (reconstructed image signal s1) by adding the prediction image data (prediction image signal s5) and the prediction error data (prediction error signal e3) already subjected to the inverse quantization and inverse transform by the inverse quantizing/inverse transforming unit 130.

The deblocking filtering unit 150 performs filtering on the reconstructed image data (reconstructed image signal s1). Here, the deblocking filtering unit 150 executes filtering on the CU edges, PU edges, and TU edges. Each of the CU edges means an edge which appears due to block noises etc. in the quantization process at the boundary between two adjacent coding units CU. Likewise, the edges each of which is at the boundary between two prediction units (PU) are referred to as PU edges, and the edges each of which is at the boundary between two transform units are referred to as TU edges.

The deblocking filtering unit 150 includes a plurality of deblocking filters having different strengths and a filter control unit which controls the plurality of deblocking filters (both are not shown in FIG. 1). Here, a description is given of a case where the deblocking filtering unit 150 includes two kinds of deblocking filters one of which is for narrow bands and the other of which is for wide bands. For example, in the H.264/MPEG-4 AVC, in the case of a large block noise, a strong (narrowband) low-pass filter is used as a deblocking filter. In the other case of a small block noise, a weak (wideband) low-pass filter is used as a deblocking filter. The strength of the low-pass filter is determined by a prediction signal s' and a quantized prediction error signal e'. The deblocking filter generally smoothes block edges, and thus the decoded image has an increased subjective image quality. Furthermore, the filtered reconstructed image data (reconstructed image signal s2) is used in motion-compensated prediction which is performed by the predicting unit 180 to generate a prediction image data. Thus, the prediction image data has a reduced prediction error. Thus, an increased coding efficiency is achieved.

Filtering processes are described in detail later.

The sample adaptive offsetting unit 155 performs, on a per pixel unit basis, a process of assigning an offset value for approximation to the original pixel values onto the reconstructed image data (reconstructed image signal s2) filtered by the deblocking filtering unit 150.

The adaptive loop filtering unit 165 includes an adaptive loop filter, and performs a process of compensating image distortion due to compression onto the reconstructed image data (reconstructed image signal s3) output from the sample adaptive offsetting unit 155. As such an adaptive loop filter, a Wiener filter is generally used which has filter coefficients determined to minimize the mean square error between the reconstructed image signal s1 and the input image signal S0.

By use of the sample adaptive offsetting unit 155 and the adaptive loop filtering unit 165, it is possible to increase the adaptability to the original image on a per pixel unit, and to thereby increase the image quality.

The frame memory 170 stores, on a per frame basis, the reconstructed image data (reconstructed image signal s4) already subjected to the application of the adaptive loop filter.

The predicting unit 180 includes an intra predicting unit which performs spatial prediction (intra prediction) to generate a prediction image, and an inter predicting unit which performs temporal prediction (inter prediction) to generate a prediction image (the intra predicting unit and the inter predicting unit are not shown in the drawings). The predicting unit 180 can select the prediction type on a per frame basis or a per block basis. The intra predicting unit performs intra prediction using the reconstructed image on a per block basis stored in the frame memory 170 to generate an intra prediction image data of a current block to be coded. The inter predicting unit performs inter prediction using the reconstructed image data on a per frame basis stored in the frame memory 170 and a motion vector derived by motion estimation etc., to generate an inter prediction image data of a current block to be coded. It is to be noted that each of the motion vectors may be determined to have a spatial sub-pixel resolution of ½ pixel, ¼ pixel, or the like.

The entropy encoder 190 performs variable length coding on the prediction error data (prediction error signal e2) to generate a coded bitstream. The variable length coding is performed using, for example, run-length codes. This variable length coding further reduces the amount of data.

[Deblocking Filtering Method in Comparison Example]

Hereinafter, filtering processes using deblocking filters are described in detail with reference to FIGS. 2A to 5.

It is to be noted that each of the filtering processes using the deblocking filters may include a step of setting a filter and a step of filtering a cording target block CU according to the setting in the control step. The control step includes (i) a step of determining whether filtering is executable or not and (ii) a step of selecting a deblocking filter to be used. The selecting step (ii) includes calculating each of parameters which define an operation of the deblocking filter, for example, calculating etc. of $t_c$ indicating a limit range in the filtering process.

[(1) Determining Executability of Filtering]

It is desirable that a filtering using a deblocking filter should be applied to a block boundary edge which appears due to a block noise but should not be applied to an input image edge which appears without being affected by any block noise. This is because, for example, if an input image edge not affected by any block noise is filtered using a deblocking filter, the image may be unnecessarily smoothed or may suffer image distortion. On the other hand, if a block boundary edge affected by a block noise is not filtered using a deblocking filter, the block noise may remain.

For this reason, in the filtering using a deblocking filter, it is important to accurately differentiate a block boundary edge affected by a block noise produced in a quantization process etc. and an input image edge not affected by any block noise.

Hereinafter, steps of determining executability of filtering are described with reference to FIGS. 2A to 3B.

Although there are several schemes for determining executability of filtering, each of the schemes described here is for determination based on the pixel values at both sides of a block boundary.

Figure 2A:
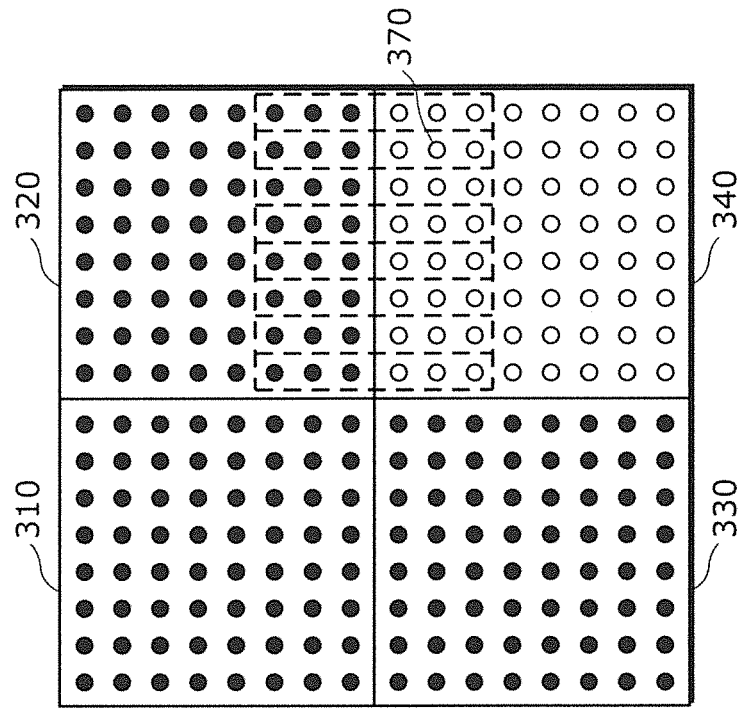
FIG. 2A is a diagram showing exemplary two coding block units CU adjacent to each other in a horizontal direction.
Figure 2B:
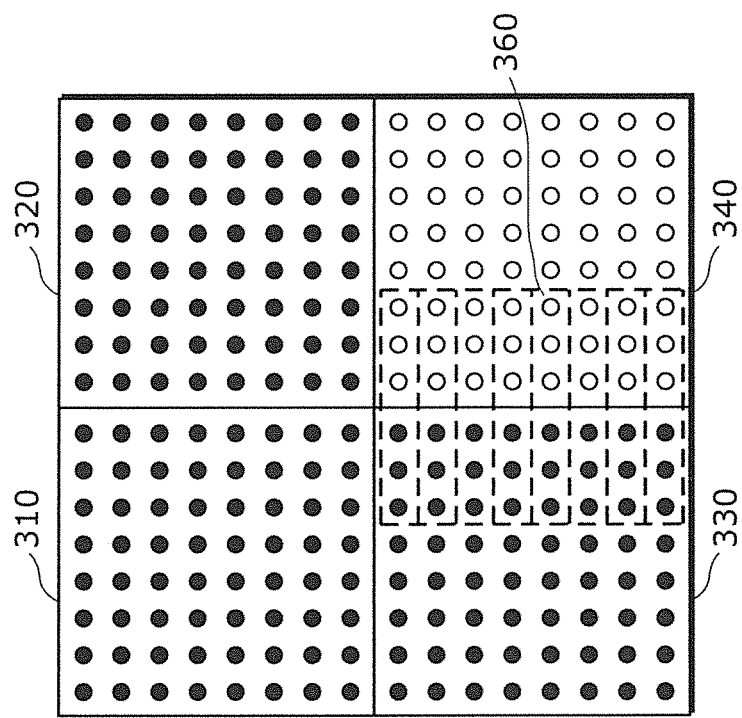
FIG. 2B is a diagram showing exemplary two coding block units CU adjacent to each other in a vertical direction.

FIG. 2A is a diagram showing pixels to be used in a step of determining the executability of filtering at the boundary between exemplary two coding block units CU adjacent to each other in a horizontal direction. FIG. 2B is a diagram showing pixels to be used in a step of determining the executability of filtering at the boundary between exemplary two coding block units CU adjacent to each other in a vertical direction. It is to be noted that, in FIG. 2A and FIG. 2B, a block 340 is a current block to be processed, and blocks 310, 320, and 330 are processed (coded or decoded) blocks. In addition, in FIG. 2A, pixel lines 360 each made up of pixels arranged in the horizontal direction are set on a per line basis. Each pixel line 360 is made up of six pixels in total, specifically three pixels at each of the sides with respect to a boundary. Likewise, in FIG. 2B, pixel lines 370 each made up of pixels arranged in the vertical direction are set on a per line basis. Each pixel line 370 is made up of six pixels in total, specifically three pixels at each of the sides with respect to a boundary. The executability determining step is executed on a per pixel line basis.

FIG. 3A is a graph showing examples of pixel values of pixels included in the pixel line 360 shown in FIG. 2A. In addition, FIG. 3B is a diagram specifically showing the example of the adjacent block 330 shown in FIG. 2A (a block A in FIGS. 3A and 3B) and the processing target block 340 (a block B in FIGS. 3A and 3B). A line 410 shown in FIG. 3A shows the boundary between the block A and the block B. In FIG. 3B, a pixel $pr_y$ is a pixel included in the block A. The pixel $qr_c$ is a pixel included in the block B. It is to be noted that r denotes an index for specifying a pixel line, and represents 0, 1, . . . for the pixel closest to the line 410, the pixel next closest to the line 410, . . . , respectively. In addition, c denotes an index for specifying a pixel line, and represents 0, 1, . . . for the pixel uppermost, the pixel next uppermost, . . . , respectively.

For example, in the H.264/MPEG-4 AVC, the step of determining the executability is performed according to the scheme indicated below. The H.264/MPEG-4 AVC involves evaluation of the absolute values of first derivation (first derived function) in the adjacent block A and the processing target block B (for example, see Patent Literature 1). Here, a description is given of a determination which is made using the pixel line 360 shown in FIG. 2A. In addition, the determination here is made for each of the pixel lines on a per pixel line basis. For each of the pixels p0 and q0, a determination that filtering should be executed is made when conditions shown by Expressions 1 to 3 below are satisfied.

[Math. 1]

$$|p_0 - q_0| < \alpha_{H264}(QP_{New}) \quad \text{(Expression 1)}$$

[Math. 2]

$$|p_1 - p_0| < \beta_{H264}(QP_{New}) \quad \text{(Expression 2)}$$

[Math. 3]

$$|q_1 - q_0| < \beta_{H264}(QP_{New}) \quad \text{(Expression 3)}$$

Here, in general, $\beta_{H264}(QP_{New}) < \alpha_{H264}(QP_{New})$ is satisfied.

In addition to the above three conditions, a pixel p1 is filtered when a condition shown by Expression 4 below is satisfied.

[Math. 4]

$$|p_2 - p_0| < \beta_{H264}(QP_{New}) \quad \text{(Expression 4)}$$

In addition to the above three conditions shown by Expressions 1 to 3, a pixel q1 is filtered when a condition shown by Expression 5 below is satisfied.

[Math. 5]

$$|q_2 - q_0| < \beta_{H264}(QP_{New}) \quad \text{(Expression 5)}$$

Conditions shown by Expressions 1 to 5 correspond to evaluation of first derivation in a first block and evaluation of first derivation in a second block. In Expressions 1 to 5, a QP is a quantization parameter showing the amount of quantization (a quantization step size) applied in a quantization process, and each of β and α is a scalar constant. In particular, a $QP_{New}$ is a quantization parameter derived based on quantization parameters QPA and QPB used for the first block A and the second block B, as shown by Expression 6 below.

[Math. 6]

$$QP_{New}=(QP_A+QP_B+1)>>1 \quad \text{(Expression 6)}$$

Here, ">>n" shows a shift to the right by n bit(s) (1 bit in the above expression).

As described above, in the H.264/MPEG-4 AVC, the executability is determined using all the pixel lines 360, but this is exemplary.

For example, in the HEVC, executability is determined using some of pixel lines 360 on a per block basis (see Non-patent Literature 1).

Hereinafter, a step of determining the executability of filtering in the HEVC is described with reference to FIGS. 3A and 3B. In the HEVC, the absolute values of second derivation (second derived functions) in an adjacent block A and a processing target block B are evaluated. It is to be noted that, in FIGS. 3A and 3B, executability is determined on a per block basis using the two pixel lines 430 of third and sixth lines from the top line.

More specifically, first, an evaluation value $d_p$ and an evaluation value $d_q$ for determining the executability are calculated using Expression 7 below.

[Math. 7]

$$d_{p2}=|p2_2-2\cdot p1_2+p0_2| \, d_{q2}=|q2_2-2\cdot q1_2+q0_2|$$

$$d_{p5}=|p2_5-2\cdot p1_5+p0_5| \, d_{q5}=|q2_5-2\cdot q1_5+q0_5|$$

$$d_p=|d_{p2}+d_{p5} \, d_q=d_{q2}+d_{q5} \quad \text{(Expression 7)}$$

Here, the evaluation value $d_p$ and the evaluation value $d_q$ correspond to the results of the evaluation of the second derivation in the first block and the evaluation of the second derivation in the second block. When a condition shown by Expression 8 below is satisfied, a determination that filtering should be performed is made for all the eight pixel lines shown in FIG. 3B.

[Math. 8]

$$d=d_p+d_q<\beta(QP) \quad \text{(Expression 8)}$$

It is to be noted that no filtering is executed when all the above conditions are not satisfied.

[(2) Selecting Deblocking Filter For Use]

When it is determined, in the aforementioned determining step, that filtering should be executed, a selecting step is executed which is for selecting a deblocking filter for use from among a plurality of deblocking filters having different strengths.

The comparison example describes a case of selecting a deblocking filter for use based on a boundary strength BS.

FIG. 4A is a flowchart showing a processing procedure of filtering steps. In addition, FIG. 4B shows two blocks which are blocks $B_P$ and $B_Q$ adjacent to each other in a horizontal direction. FIG. 4C shows two blocks which are blocks $B_P$ and $B_Q$ adjacent to each other in a vertical direction.

In Step S1000, the filter control unit of the deblocking filtering unit 150 shown in FIG. 1 calculates a boundary strength BS as a first parameter. The value of the boundary strength BS is an integer larger than or equal to 0. The procedure for calculating such a boundary strength BS is described in detail later.

In Step S1010, the filter control unit determines whether or not the boundary strength BS calculated in Step S1000 is an integer or not. When it is determined that the BS is not a positive value (BS=0) in Step S1010 (No in S1010), the filter control unit terminates the processing without executing filtering.

On the other hand, when it is determined that the BS is a positive value in Step S1010 (Yes in S1010), the filter control unit calculates a threshold value $t_c$ which defines an output range for a deblocking filter and a threshold value $\beta$ for selecting the deblocking filter. The threshold value $t_c$ which defines the output range for the deblocking filter and the threshold value $\beta$ for selecting the deblocking filter are described in detail later.

In Step S1030, the filter control unit selects the deblocking filter based on the threshold value $\beta$. This selection may mean that no deblocking filter is selected. More specifically, based on the threshold value $\beta$, the filter control unit selects any one of a strong filter, a weak filter, or no filter.

When the strong filter is selected in Step S1030, the filter control unit performs filtering on a current block boundary to be processed, using a deblocking filter for narrow bands (S1032). When the weak filter is selected in Step S1030, the filter control unit performs filtering on a current block boundary to be processed, using a deblocking filter for wide bands (S1034). When no filter is selected in Step S1030, the filter control unit does not perform filtering (S1036).

With the execution of such filtering steps, it is possible to smooth each of edges at block boundaries in reconstructed image data, and to thereby increase the image quality of the reconstructed image.

The steps of calculating various kinds of parameters to be used in the aforementioned deblocking filter selecting steps are described in detail here.

First, how to calculate a boundary strength is described.

Figure 5:
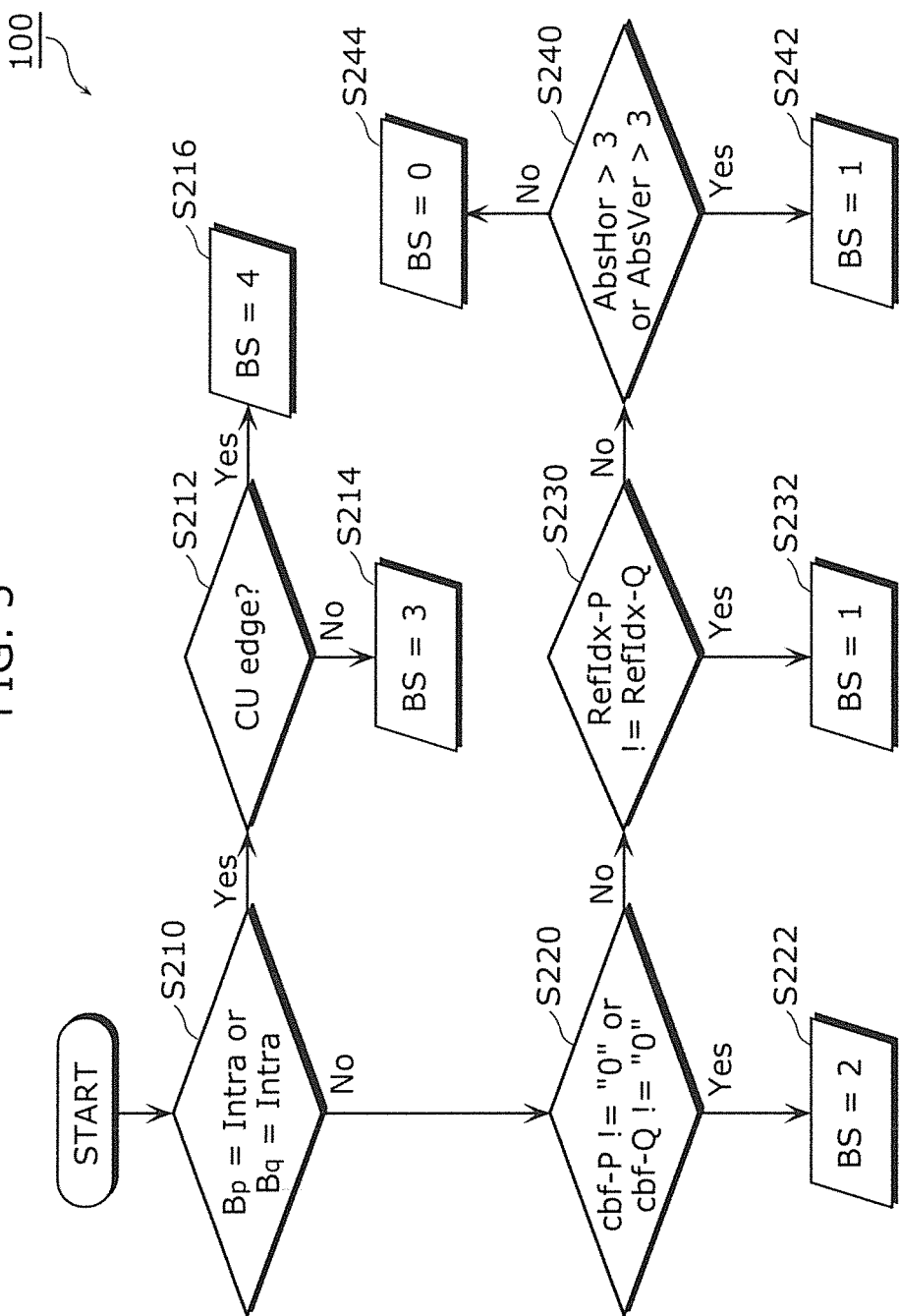
FIG. 5 is a diagram showing processing procedures of steps of calculating boundary strengths BS in the comparison example.

The scheme for calculating a boundary strength BS in Step S1000 in FIG. 4A is described based on FIG. 5. FIG. 5 is a flowchart showing possible processing procedures of steps of calculating the boundary strength BS in Step S1000.

Here, there is a correlation between the value of a boundary strength BS and the size of a block noise. In general, the larger the boundary strength BS is, the larger the block noise is. In the flowchart of FIG. 5, the conditions for determining a boundary strength BS are set as follows: (i) whether or not a current block is an intra coded image; (ii) whether or not a current edge is a CU edge; (iii) whether or not a cbf flag is 0 (the cbf flag shows whether or not a coefficient is held); (iv) whether or not the two blocks sharing a boundary refers to the same reference picture; and (v) the absolute difference in pixel values between pixels is larger than a predetermined threshold value. It is to be noted that the determination conditions in the setting of such a boundary strength BS may be another determination condition such as the condition on whether or not a motion vector to be used in motion compensated prediction for a current block to be coded is the same as a motion vector used in motion compensated prediction for an adjacent block.

In Step S210, the filter control unit 153 (FIG. 6) of the deblocking filtering unit 150 (FIG. 1 and FIG. 6) determines whether or not at least one of the blocks $B_P$ and $B_Q$ is an intra coded image. The intra coded image (I-picture) tends to have a large quantization error generated in quantization, compared to an inter coded image. For this reason, when at least one of the blocks $B_P$ and $B_Q$ is an intra coded image, a comparatively large value is set as a boundary strength.

When it is determined that at least one of the blocks $B_P$ and $B_Q$ is an intra coded image (YES in Step S210), in Step S212, the filter control unit 153 determines whether or not a current block boundary to be processed is the boundary between coding units CU (whether or not a current edge to be processed is a CU edge).

When the current block boundary to be processed is determined to be a CU edge (YES in Step S212), the value of the boundary strength BS is set to 4 (Step S216). On the other hand, when the current block boundary to be processed is determined not to be a CU edge (NO in Step S212), for example, when the current block boundary to be processed is a PU edge or a TU edge, the value of the boundary strength BS is set to 3 (Step S214).

When both of the blocks $B_P$ and $B_Q$ are determined not to be intra coded images in Step S210 (No in S210), it is determined whether or not one of the values of a flag cbf-P and a flag cbf-Q is non-0 (S220). Here, the flag cbf-P is a flag showing whether or not the block $B_P$ has a coefficient. The flag shows the presence of the coefficient when the value is non-0, and the flag shows the absence of the coefficient when the value is 0. Likewise, the flag cbf-Q is a flag showing whether or not the block $B_Q$ has a coefficient.

When both the flag cbf-P and the flag cbf-Q are determined to be 0 (YES in S220), in Step S222, the value of the boundary strength BS is set to 2.

On the other hand, when one of the flag cbf-P and the flag cbf-Q is determined to be 0 (NO in S220), a determination is made as to whether or not a reference picture index RefIdx-P of the block $B_P$ and a reference picture index RefIdx-Q of the block $B_Q$ are different from each other (S230). It is to be noted that the reference picture index RefIdx-P is an index showing a picture to be referred to in the prediction of the block $B_P$. The reference picture index RefIdx-Q is an index showing a picture to be referred to in the prediction of the block $B_Q$.

When it is determined that the reference picture index RefIdx-P and the reference picture index RefIdx-Q are different (YES in S230), the value of the boundary strength BS is set to 1.

On the other hand, when it is determined that the reference picture index RefIdx-P and the reference picture index RefIdx-Q are the same (NO in S230), whether or not one of a parameter AbsHor and AbsVer is larger than 3 is determined (S240). Here, the parameter AbsHor is represented by the absolute difference in the horizontal components between a motion vector to be used in the prediction of the block $B_P$ and a motion vector to be used in the prediction of the block $B_Q$. Here, the parameter AbsVer is represented by the absolute difference between the vertical component of the motion vector to be used in the prediction of the block $B_P$ and the vertical component of the motion vector to be used in the prediction of the block $B_Q$. Although 3 is used as the determination value for the parameters AbsHor and AbsVer in Step S240, the determination value is not limited thereto.

When one of the parameters AbsHor and AbsVer is determined to be larger than 3 (YES in S240), the value of the boundary strength BS is set to 1 (S242).

When both the parameters AbsHor and AbsVer are determined to be smaller than or equal to 3 (NO in S240), the value of the boundary strength BS is set to 0 (S244).

The deblocking filtering unit 150 performs filtering using a stronger filter as the value of the boundary strength BS is larger. When the value of the boundary strength BS is 0, the deblocking filtering unit 150 does not execute any filtering. The stronger the deblocking filter ("a stronger filter") is, the deblocking filtering unit 150 substantially modifies the pixel values of the pixels at the boundary.

Next, how to calculate a parameter $t_c$ is described.

A description is given of a scheme for calculating a threshold value $t_c$ for a deblocking filter in Step S1020 of FIG. 4A.

As a scheme for calculating such a threshold value $t_c$ for a deblocking filter, for example, the AVC provides, as shown in Expression 9 below, a scheme for deriving a $t_c$ using a two-dimensional coding table of indices which are quantization parameters QP and the values of boundary strengths BS.

[Math. 9]

$$t_c = \text{cliptable}[QP][BS] \quad \text{(Expression 9)}$$

However, this scheme has a problem that a large-capacity memory is required to store the two-dimensional coding table because of the large amount of data to be stored in the two-dimensional coding table. In addition, since a large amount of data is read out from the large-capacity memory, it is difficult to increase the processing efficiency.

As another scheme for calculating such a threshold value $t_c$ for a deblocking filter, for example, the HEVC (starting from the HM version 1.0) provides a scheme for deriving the threshold value $t_c$ using a one-dimensional coding table of indices which are variable $t_c$_offset. The parameter $t_c$_offset is calculated based on the value of the boundary strength BS derived in Step S1000 in FIG. 4A. The filter control unit sets 0 to $t_c$_offset when the boundary strength BS is 2 or less, and sets 2 to $t_c$_offset when the boundary strength BS is larger than 2. According to Expression 10 below, a parameter $t_c$ is determined.

[Math. 10]

$$t_c = \text{Tctable}[QP + t_c\_\text{offset}] \quad \text{(Expression 10)}$$

Here, the value of $t_c$_offset is set to 2 when the boundary strength BS is larger than 2, and the value of $t_c$_offset is set to 0 when the boundary strength BS is smaller than or equal to 2. A function Tctable [ ] is a table function, and $t_c$ is derived based on the arguments in the [ ]. This table is defined in Non-patent Literature 3 cited above.

[Details of Problem]

Filtering in a comparison example has been described above.

As described above, there are demands for further adaptability to block noises in filtering processes by deblocking filters. In order to further increase the adaptability to the block noises, for example, it is desirable that a current deblocking filter to be used in a filtering process should be appropriately selected from among different deblocking filters.

In order to solve the problem, a deblocking filtering scheme according to an aspect in the present disclosure is an image processing method of performing filtering on image blocks using a plurality of deblocking filters having different filter strengths, the image processing method including: a first parameter calculating step of calculating a first parameter indicating a boundary strength between two adjacent image blocks; a second parameter calculating step of calculating a second parameter indicating a limit value for each of the deblocking filters, based on the first parameter and a quantization parameter; and a selecting step of selecting a deblocking filter to be used in the filtering from among the deblocking filters, using one or more threshold values which are determined based on the second parameter.

According to the image processing method including these steps, the second parameter Tc is used to select one of the deblocking filters. Thus, it is possible to further increase the adaptability to block noises in the filtering process using the deblocking filter. In this way, it is possible to further increase the image quality of the image after being subjected to the filtering process.

In addition, for example, in the second parameter calculating step, the second parameter may be calculated using a linear sum of the first parameter and the quantization parameter.

As described above, in the HEVC scheme, the steps of calculating a variable $t_c\_offset$, referring to a one-dimensional coding table, and the like tend to be complex. For this reason, there are demands for reducing intermediate steps and intermediate parameters in the calculation of parameters to be used in the step of selecting a deblocking filter without requiring a large memory space, so as to increase the processing efficiency.

According to the image processing method including these steps, since the second parameter Tc is defined based on a linear sum of the first parameter (the boundary strength BS) and the quantization parameter QP, it is possible to derive the second parameter Tc using a simple operation. With this, no large memory space is required. Furthermore, according to the deblocking filtering scheme, since the second parameter Tc is defined based on a linear sum of the first parameter (the boundary strength BS) and the quantization parameter QP, it is possible to suppress increase of intermediate steps and intermediate parameters.

Furthermore, selecting one of the deblocking filters using the second parameter Tc derived using such a simple operation makes it possible to reduce the processing amount required for the selection, and to thereby increase the processing efficiency.

Furthermore, according to the image processing method including these steps, since the second parameter Tc is defined based on a linear sum of the first parameter (the boundary strength BS) and the quantization parameter QP, it is possible to increase the image quality of the image after being subjected to the filtering process.

In addition, for example, in the second parameter calculating step, the second parameter may be calculated such that a value of the second parameter is larger when a value of the first parameter is larger. Furthermore, for example, in the second parameter calculating step, the second parameter may be calculated such that the value of the second parameter is larger when a value of the quantization parameter is larger.

According to the image processing method including these steps, since the second parameter Tc (for example, the threshold value for a loop filter) is changed depending on a boundary strength BS, it is possible to increase the image quality after being subjected to the filtering process.

For example, in a comparison example shown in FIG. 5, for example, Tc=0 is set in each of the cases where BS=1 and BS=2. In other words, for example, the same threshold value is set for a loop filter irrespective of the boundary strengths BS.

In contrast, according to the image processing method, the second parameters Tc are set depending on the boundary strengths. For example, Tc is set to be 1 when BS=2, and Tc is set to 0 when BS=1. Thus, it is possible to set filters further adapted to images.

In addition, for example, in the selecting step, each of the one or more threshold values may be calculated such that the threshold value is larger when a value of the second parameter is larger.

According to the image processing method, it is possible to set the threshold values appropriately.

In addition, for example, in the selecting step: a first threshold value and a second threshold value may be determined, the first threshold value being for selecting one of the deblocking filters, and the second threshold value being for determining whether or not to select any one of the deblocking filters; and the one of the deblocking filters or not to use any one of the deblocking filters may be selected.

In addition, for example, the image processing method may further include an executability determining step of determining whether or not to perform the filtering using the first parameter before executing the selecting step.

In addition, for example, the first parameter calculating step may include: a first determining step of determining whether or not at least one of the two adjacent image blocks is a block to be intra coded; and a setting step of setting a first fixed value to the first parameter when it is determined in the first determining step that the at least one of the two adjacent image blocks is the block to be intra coded.

In addition, for example, the first parameter calculating step may further include a setting step of setting, to the first parameter, a second fixed value different from the first fixed value when it is determined in the determining step that both of the two adjacent image blocks are blocks not to be intra coded.

In addition, for example, the first parameter calculating step may further include: a second determining step of determining whether or not at least one of the two adjacent image blocks includes at least one non-zero transform coefficient when it is determined in the first determining step that both of the two adjacent image blocks are blocks not to be intra coded; and a setting step of setting the first parameter using a result of the second determining step.

In addition, for example, when it is determined in the first determining step that both of the two adjacent image blocks are blocks not to be intra coded, the first parameter calculating step may further include: a second determining step of determining whether or not at least one of the two adjacent blocks includes at least one non-zero coefficient; a third determining step of determining whether or not the two adjacent image blocks have different reference indices each indicating a reference picture in inter coding; a fourth determining step of determining whether or not a difference absolute value between the two adjacent image blocks exceeds a predetermined threshold value, the difference absolute value being one of a difference absolute value between horizontal motion vector components of the two adjacent image blocks and a difference absolute value between vertical motion vector components of the two adjacent image blocks; and a setting step of setting the first fixed value to the first parameter in the case where (i) it is determined in the second determining step that the at least one non-zero transform coefficient is included, (ii) it is determined in the third determining step that the reference picture indices are the same, and (iii) it is determined in the fourth determining step that the difference absolute value exceeds the predetermined threshold value; or in cases other than the case, a setting step of setting a second fixed value different from the first fixed value to the first parameter.

In addition, for example, the image processing method may include a compressing step of compressing a prediction error block which is a difference between a current block to be coded and a prediction block each of which includes a plurality of pixels; a reconstructing step of generating a reconstructed block by decoding the prediction error block compressed and adding the decoded prediction error block to the prediction block; a filtering step including the first parameter calculating step, the second parameter calculating step, and the selecting step, the filtering step being executed for the reconstructed block; a predicting step of generating a prediction block using the reconstructed block filtered in the filtering step; and a coding step of coding the compressed prediction error block to generate a coded bitstream.

In addition, for example, the image processing method may include an obtaining step of obtaining a bitstream including a current block to be decoded; a generating step of generating a reconstructed block by decoding the current block to be decoded and adding the decoded current block to a prediction block; a filtering step including the first parameter calculating step, the second parameter calculating step, and the selecting step, the filtering step being executed for the reconstructed block; and a predicting step of generating a prediction block using the reconstructed block filtered in the filtering step.

In order to solve the aforementioned problem, an image processing apparatus according to an aspect in the present disclosure is an image processing apparatus which performs filtering on image blocks using a plurality of deblocking filters having different filter strengths, the image processing apparatus including: a first parameter calculating unit configured to calculate a first parameter indicating a boundary strength between two adjacent image blocks; a second parameter calculating unit configured to calculate a second parameter indicating a limit value for each of the plurality of deblocking filters, based on the first parameter and a quantization parameter; and a selecting unit configured to select a deblocking filter to be used in the filtering from among the plurality of deblocking filters, using one or more threshold values which are determined based on the second parameter, wherein the second parameter calculating unit is configured to calculate, as the value of the second parameter, a total value of the first parameter and the quantization parameter.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, deblocking filtering schemes (image processing methods) according to an aspect in this disclosure and deblocking filtering apparatuses (image processing apparatuses) are described in detail with reference to the drawings.

Each of the exemplary embodiments described below shows a general or specific example. The numerical values, shapes, materials, structural elements, the arrangement positions and connection forms of the structural elements, steps, the order of the steps etc. shown in the following exemplary embodiments are mere examples, and therefore do not limit the scope of the image processing methods and the image processing apparatuses according to this disclosure. In addition, among the structural elements in the following exemplary embodiments, structural elements not recited in any one of the independent claims which define the most generic concept are described as arbitrary structural elements.

Embodiment 1

An image processing method and an image processing apparatus according to Embodiment 1 are described with reference to FIGS. 1 to 3B, and FIGS. 7A to 9. It is to be noted that this embodiment describes cases where the image processing method and the image processing apparatus are applied to a moving picture coding method and a moving picture coding apparatus, respectively.

The moving picture coding apparatus in this embodiment has a structure similar to the structure of the moving picture coding apparatus in the comparison example shown in FIG. 1. The moving picture coding apparatus in this embodiment is different in the structure of a deblocking filtering unit 150 from the moving picture coding apparatus 100 in the comparison example.

The deblocking filtering unit 150 in this embodiment includes a plurality of deblocking filters having different strengths and a filter control unit which controls the plurality of deblocking filters.

Figure 6:
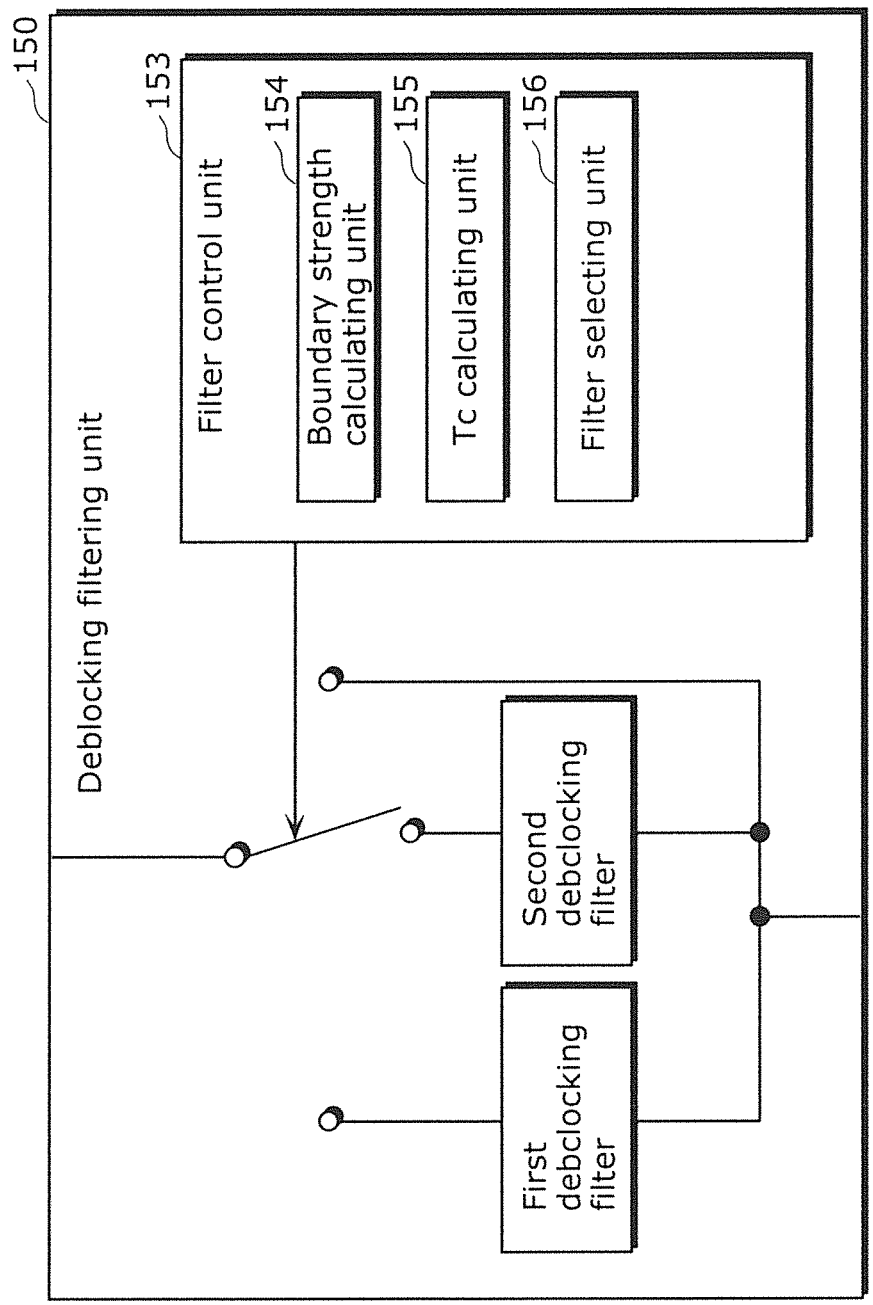
FIG. 6 is a block diagram showing an exemplary structure of a deblocking filtering unit in the moving picture coding apparatus according to embodiments.

FIG. 6 is a block diagram showing an exemplary structure of the deblocking filtering unit 150. As shown in FIG. 1, the deblocking filtering unit 150 in this embodiment includes a first deblocking filter 151, a second deblocking filter 152, and the filter control unit 153. The first deblocking filter is a strong deblocking filter for narrow bands. The second deblocking filter is a weak deblocking filter for wide bands. It is to be noted that the number and structures of deblocking filters are not limited thereto.

As shown in FIG. 6, the filter control unit 153 includes a boundary strength calculating unit 154, a Tc calculating unit 155, and a filter selecting unit 156.

[1.1 Outline of Deblocking Filtering Scheme]

Hereinafter, filtering by the deblocking filtering unit 150 in this embodiment is described in detail with reference to FIGS. 2A to 3B, and FIGS. 7A to 9.

As in the above-described comparison example, in the filtering, the following steps are executed: (1) determining whether or not filtering is executable (this step corresponds to an executability determining step; and (2) selecting one of the deblocking filters to be used. The step (1) of determining whether or not filtering is executable is the same as in the comparison example.

[1.1.1 (2) Selecting Deblocking Filter To Be Used]

When it is determined, in the aforementioned determining step, that filtering should be executed, a selecting step is executed which is for selecting a deblocking filter to be used from among the plurality of deblocking filters having different strengths.

FIG. 7A is a flowchart showing processing procedures of filtering steps according to embodiments. In addition, FIG. 7B shows two blocks which are blocks $B_P$ and $B_Q$ adjacent to each other in the horizontal direction. FIG. 7C shows tow blocks which are blocks $B_P$ and $B_Q$ adjacent to each other in the vertical direction.

Figure 8:
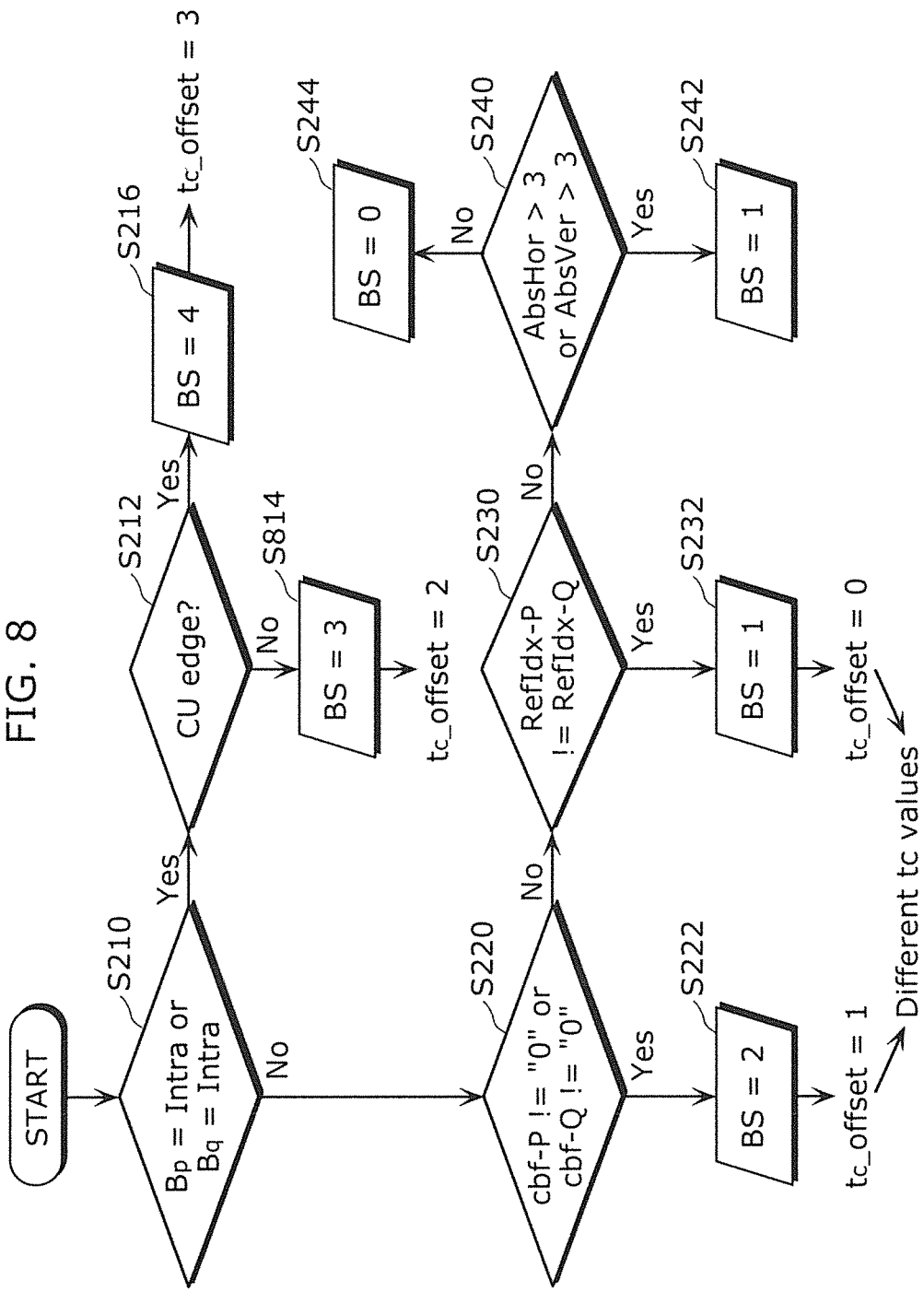
FIG. 8 is a flowchart showing processing procedures of calculating boundary strengths BS and setting offset values $t_c\_offset$ of threshold values $t_c$ in the embodiments.

In Step 100, the boundary strength calculating unit 154 of the filter control unit 153 calculates the boundary strength BS as a first parameter (a first parameter calculating step). FIG. 8 is a flowchart showing processing procedures of calculating boundary strengths BS and setting offset values $t_c\_offset$ of threshold values $t_c$ in the embodiments. The values of the boundary strengths BS are integers larger than or equal to 0. It is to be noted that the procedure (S210 to S244) for calculating a boundary strength BS is the same as in the comparison example.

Furthermore, the boundary strength calculating unit 154 sets an offset value $t_c\_offset$ as a threshold value $t_c$ according to the value of the boundary strength BS as shown in FIG. 8 in this embodiment. In this embodiment, the values of $t_c\_offset$ are different when the values of the BS are different. More specifically, $t_c\_offset=3$ is set when BS=4 is satisfied, $t_c\_offset=2$ is set when BS=3 is satisfied, $t_c\_offset=1$ is set when BS=2 is satisfied, and $t_c\_offset=0$ is set when BS=1 is satisfied. In the comparison example, the value of $t_c\_offset$ is constant irrespective of a boundary strength BS (AVC), or the same $t_c\_offset$ is assigned to a plurality of boundary strengths BS (HEVC).

In Step S110, the filter control unit 153 determines whether or not the boundary strength BS calculated in Step S100 is a positive value or not. When it is determined that the BS is not a positive value (BS=0) in Step S110 (No in S110), the filter control unit 153 terminates the processing without executing filtering.

On the other hand, when it is determined that the BS is a positive value (BS=0) in Step S110 (Yes in S110), a Tc calculating unit of the filter control unit 153 calculates a threshold value $t_c$ which defines an output range for a deblocking filter in step S120 (a second parameter calculating step).

In this embodiment, the threshold value $t_c$ is represented using a table function including, as arguments, a boundary strength BS, a quantization parameter QP, and a $t_c$_offset. In this embodiment, since the values of $t_c$_offset are different when the boundary strengths BS are different, the number of values possible as the threshold value $t_c$ tends to be larger than in the comparison example. In this way, it is possible to increase the adaptability of the deblocking filter.

Furthermore, the filter control unit 153 calculates a threshold value β for selecting a deblocking filter to be used. The threshold value β can be represented as a function (β(QP)) of a quantization parameter QP.

In step S130, the filter selecting unit 156 of the filter control unit 153 selects the deblocking filter based on the threshold value $t_c$ and the threshold value β (a selecting step). This selection may mean that no deblocking filter is selected. More specifically, the filter selecting unit 156 determines whether or not the strong filter should be selected based on the threshold value β.

More specifically, for example, the strong filter is selected when the condition shown by Expression 11 below is satisfied.

[Math. 11]

$$\{|p3_i-p0_i|+|q3_i-q0_i|<(\beta QP)>>3)\}$$

$$\wedge\{d<(\beta(QP)>>2\}$$

$$\wedge\{|p0_i-q0_i|<((t_c(QP)\cdot5+1)>>1)\} \quad \text{(Expression 11)}$$

In the above condition, each of the threshold values β and $t_c$ is represented as a function of the quantization parameter QP as mentioned earlier. The quantization parameter QP may be set for, for example, a part of an image. In general, a threshold value β is derived based on a QP, using a lookup table.

When the strong filter is selected, the first deblocking filter 151 performs strong filtering (S132). Such strong filtering is described in detail later.

When the condition shown by Expression 11 is not satisfied, the filter selecting unit 156 determines whether to select a weak filter or to select no filter.

More specifically, the filter selecting unit 156 calculates a determination value Δ (an absolute value), using Expression 12 below.

[Math. 12]

$$\Delta=|(9\cdot(q0_i-p0_i)-3\cdot(q1_i-p1_i)+8)>>4| \quad \text{(Expression 12)}$$

The weak filter is selected when Expression 13 below is satisfied.

[Math. 13]

$$\Delta<10\times T_c \quad \text{(Expression 13)}$$

When the weak filter is selected, the second deblocking filter 152 performs weak filtering (S134). Such weak filtering is described in detail later.

When Expression 13 is not satisfied, no filter is selected, and thus any filtering using a deblocking filter is not performed (S136).

[1.1.2 Filtering Using Strong Deblocking Filter]

As described above, when "the strong filter" is selected through the determination according to expression 11 in Step S130 shown in FIG. 4A, the first deblocking filter 151 performs strong filtering (S132). More specifically, the first deblocking filter 151 filters the pixels $p2_i$, $p1_i$, $p0_i$, $q0_i$, $q1_i$, and $q2_i$ using the pixels $p3_i$, $p2_i$, $p1_i$, $p0_i$, $q0_i$, $q1_i$, $q2_i$, and $q3_i$ according to an HEVC model.

Figure 9A:
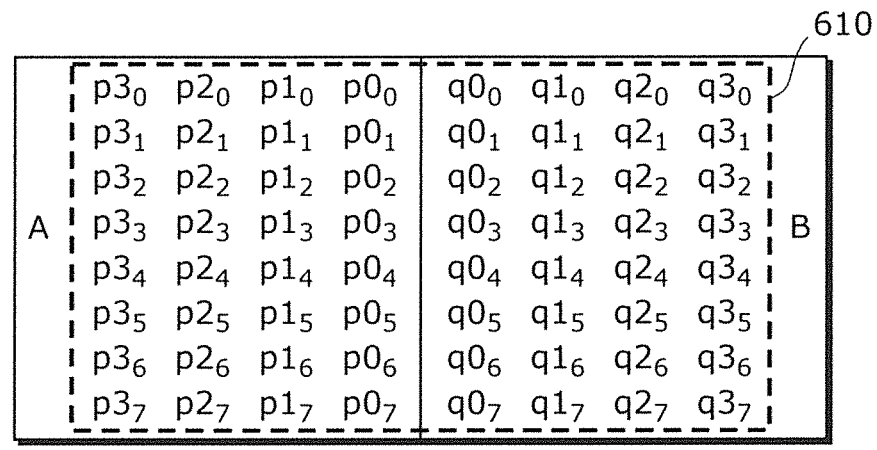
FIG. 9A is a diagram showing exemplary pixels to be used in strong filtering.
Figure 9B:
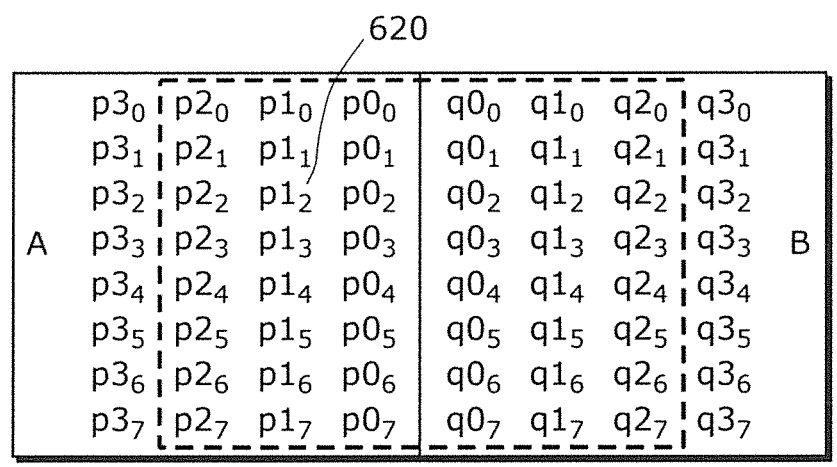
FIG. 9B is a diagram showing exemplary pixels to be filtered using strong filtering.

FIG. 9A is a diagram showing exemplary pixels to be used in the strong filtering. FIG. 9A shows pixels (samples) of two adjacent blocks sharing a vertical edge in the horizontal direction. These pixels are used in horizontal filtering. The pixels in an area 610 enclosed by broken lines are the pixels to be used in the strong filtering. FIG. 9B is a diagram showing pixels to be filtered. The pixels in an area 620 enclosed by broken lines are the pixels to be filtered using the strong filtering.

The first deblocking filter 151 in this embodiment filters the three pixels adjacent at the left side of the boundary, using the four pixels adjacent at the left side of the boundary, according to Expression 14.

[Math. 14]

$$p0_i'=\text{Clip}((p2_i+2\cdot p1_i+2\cdot p0_i+2\cdot q0_i+q2_i+4)>>3)$$

$$p1_i'=\text{Clip}((p2_i+p1_i+p0_i+q0_i+2)>>2)$$

$$p2_i'=\text{Clip}((2\cdot p3_i+3\cdot p2_i+p1_i+p0_i+q0_i+4)>>3) \quad \text{(Expression 14)}$$

Likewise, the first deblocking filter 151 in this embodiment filters the three pixels adjacent at the right side of the boundary, using the four pixels adjacent at the right side of the boundary, according to Expression 15.

[Math. 15]

$$q0_i'=\text{Clip}((q2_i+2\cdot q1_i+2\cdot q0_i+2\cdot p0_i+p2_i+4)>>3)$$

$$q1_i'=\text{Clip}((q2_i+q1_i+q0_i+p0_i+2)>>2)$$

$$q2_i'=\text{Clip}((2\cdot q3_i+3\cdot q2_i+q1_i+q0_i+p0_i+4)>>3) \quad \text{(Expression 15)}$$

It is to be noted that a function Clip(x) is defined by Expression 16 below.

[Math. 16]

$$\text{Clip}(x) = \begin{cases} 0; & x < 0 \\ \text{max\_allowed\_value}; & x > \text{max\_allowed\_value} \\ x; & \text{else} \end{cases} \quad \text{(Expression 16)}$$

Here, max_allowed_value is a maximum value that is possible as x in Clip(x). In the case of PCM coding using k-bit samples, the maximum value is considered to be max_allowed_value=$2^k$-1. For example, in the case of PCM coding using 8-bit samples, the maximum value is considered to be max_allowed_value=255. In the case of PCM coding using 10-bit samples, the maximum value is considered to be max_allowed_value=1023.

As known from the above equations, filtering is performed on a line basis. The first deblocking filter 151 filters each of the lines while sequentially changing the index i to 0, 1, 2, 3, 4, 5, 6, and 7.

[1.1.3 Filtering Using Weak Deblocking Filter]

As described above, when "the weak filter" using Expression 12 is selected in Step S130 shown in FIG. 4A, a second deblocking filter 152 for wide bands performs weak filtering (S134).

When "the weak filter" is selected, the second deblocking filter 152 performs the weak filtering (S134). More specifically, the second deblocking filter 152 filters the pixels $p1_i$, $p0_i$, $q0_i$, and $q1_i$ using the pixels $p2_i$, $p1_i$, $p0_i$, $q0_i$, $q1_i$, and $q2_i$ according to an HEVC model.

Figure 10A:
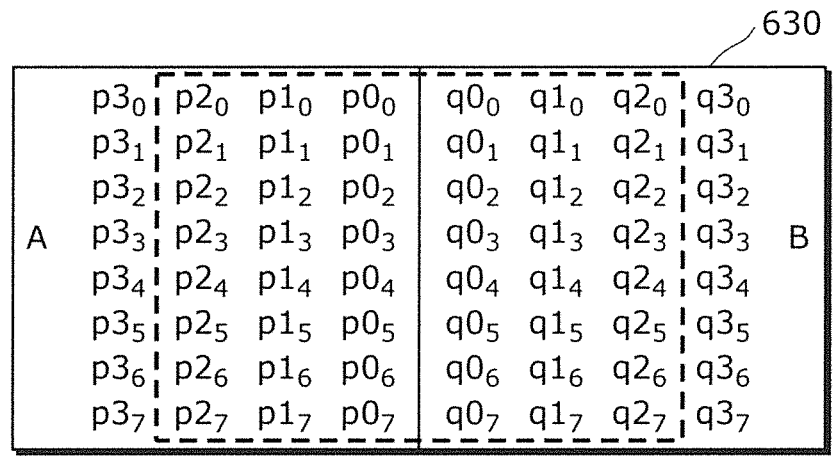
FIG. 10A is a diagram showing exemplary pixels to be used in weak filtering.
Figure 10B:
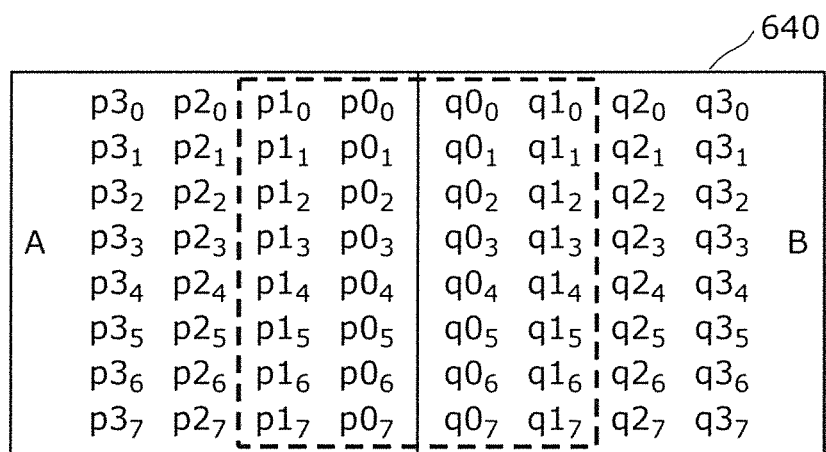
FIG. 10B is a diagram showing exemplary pixels to be filtered using weak filtering.

FIG. 10A is a diagram showing exemplary pixels to be used in the weak filtering. FIG. 10A shows pixels (samples) of two adjacent blocks sharing a vertical edge in the horizontal direction. These pixels are used in horizontal filtering. The pixels in an area 630 enclosed by broken lines are the pixels to be used in the strong filtering. FIG. 10B is a diagram showing pixels to be filtered. The pixels in an area 640 enclosed by broken lines are the pixels to be filtered using the weak filtering.

The second deblocking filter 152 in this embodiment filters the pixel $p0_i$ closest to the boundary at the left side and the pixel $q0_i$ adjacent to the boundary at the right side according to Expression 17 below.

[Math. 17]

$$p0_i'=\text{Clip}(p0_i+\Delta_1)$$

$$q0_i'=\text{Clip}(q0_i-\Delta_1) \quad \text{(Expression 17)}$$

Here, $q0_i'$ is a pixel value obtained by filtering the pixel $q0_i$, and $q0_i'$ is a pixel value obtained by filtering the pixel $q0_i$. In addition, $\Delta_1$ is calculated according to Expression 18 below.

[Math. 18]

$$\Delta_1=\text{Clip3}(-t_c,t_c,\Delta) \quad \text{(Expression 18)}$$

A function Clip3(x) is defined by Expression 19 below.

[Math. 19]

$$\text{Clip3}(x, a, b) = \begin{cases} a; & x < a \\ b; & x > b \\ x; & \text{else} \end{cases} \quad \text{(Expression 19)}$$

After filtering the pixels p0 and q0, the second deblocking filter 152 determines whether or not to filter the pixels p1$i$ and q1$i$ second closest to the boundary. It is to be noted that such determinations for the pixels p1$i$ and q1$i$ are made separately.

The determination for the pixel p1$i$ is made using an evaluation value $d_p$ shown in Expression 7 described in the filtering executability determination step (1) in the comparison example. More specifically, when $d_p<(\beta/6)$ is satisfied, the second deblocking filter 152 filters the pixel $p1_i$ according to Expression 20 below.

[Math. 20]

$$p1_i'=\text{Clip}(p1_i+\Delta_{2p}) \quad \text{(Expression 20)}$$

Here, $p1_i'$ is a pixel value obtained by filtering the pixel $p1_i$. In addition, $\Delta_{2p}$ is calculated according to Expression 21 below.

[Math. 21]

$$\Delta_{2p}=\text{Clip3}(-t_{c2},t_{c2},(((p2_i+p0_i+1)>>1)-p1_i+\Delta_1)>>1) \quad \text{(Expression 21)}$$

On the other hand, the determination for the pixel q1$i$ is made using an evaluation value $d_q$ shown in Expression 7 described in the filtering executability determination step (1) in the comparison example. More specifically, when $d_q<(\beta/6)$ is satisfied, the second deblocking filter 152 filters the pixel p1$i$ according to Expression 22 below.

[Math. 22]

$$q1_i'=\text{Clip}(q1_i-\Delta_{2p}) \quad \text{(Expression 22)}$$

Here, $p1_i'$ is a pixel value obtained by filtering the pixel $p1_i$. In addition, $\Delta_{2q}$ is obtained according to Expression 23 below.

[Math. 23]

$$\Delta_{2q}=\text{Clip3}(-t_{c2},t_{c2},(((q2_i+q0_i+1)>>1)-q1_i+\Delta_1)>>1) \quad \text{(Expression 23)}$$

Here, $t_{c2}=t_c>>1$.

Although this embodiment describes a case of performing horizontal filtering on the vertical edge, the present disclosure is applicable to a case of performing vertical filtering on a horizontal edge by exchanging the horizontal direction and the vertical direction and exchanging the pixel lines in the horizontal direction and the pixel lines in the vertical direction.

[1.1.4 Advantageous Effect Obtainable Using $t_c$ in Determination of Deblocking Filter]

In the above-described comparison example, a table function is used to calculate a threshold value $t_c$ for a loop filter. Thus, it is difficult to reduce the memory area to be used and reduce the processing amount. On the other hand, in this embodiment, a threshold value $t_c$ for a loop filter is calculated using a function based on a linear sum of a quantization parameter QP and a boundary strength BS. In addition, since $t_c\_$offset is calculated based on the BS, the calculation is not complex. For this reason, it is possible to reduce the memory area to be used and reduce the processing amount.

Although the $t_c\_$offset in the comparison example can only take a common value for all boundary strengths BS or two values, the $t_c\_$offset in this embodiment can take different values depending on boundary strengths BS. In this way, filtering is adapted to block noises with higher precision.

Figure 11:
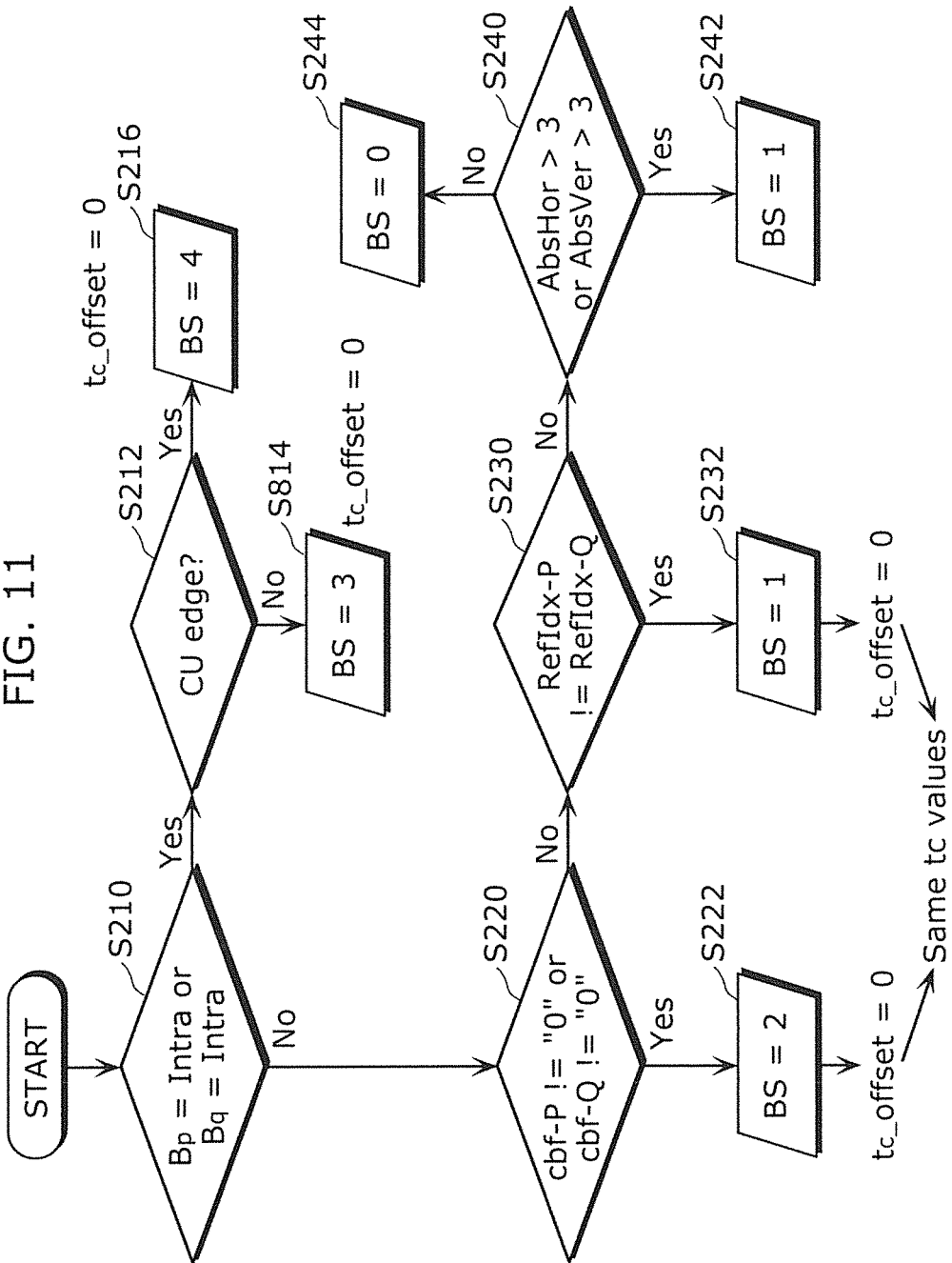
FIG. 11 is a flowchart showing processing procedures of calculating boundary strengths BS and setting offset values $t_c\_offset$ of threshold values $t_c$.

Here, FIG. 11 is a diagram showing the procedure for setting an offset value $t_c\_$offset for a threshold value $t_c$ in the comparison example. It is to be noted that the same steps in FIG. 11 as the steps in FIG. 8 are assigned with the same reference numerals.

As known from FIG. 11, in this comparison example, the same $t_c\_$offset is assigned both to a boundary strength BS=2 and a boundary strength BS=1. For this reason, in each of the cases where the boundary strength BS=2 and the boundary strength BS=1, the same value is set as the threshold value $t_c$. On the other hand, in this embodiment, as shown in FIG. 8, different values are set as the threshold values $t_c$ for the respective cases where the boundary strength BS=2 and the boundary strength BS=1. In this embodiment, since the different threshold values $t_c$ are calculated for the different boundary strengths BS, it is possible to increase the adaptability of the deblocking filter to the image. In this way, it is possible to increase the coding efficiency and increase the subjective quality.

FIG. 12A is a diagram showing the coding efficiencies in the comparison example and in the embodiments obtained using common test conditions. In addition, FIG. 12B is a diagram showing the case using high transform parameters (QP=39, 41, 43, and 45). In each of FIG. 12A and FIG. 12B, the left side of the table shows the coding efficiencies in the comparison example, and the right side of the table shows the coding efficiencies in this embodiment. The coding efficiencies are shown as BD rates calculated using piecewise cubic interpolation.

[1.1.5 Determination of Tc Depending on BS Value (Variation 1)]

Figure 13:
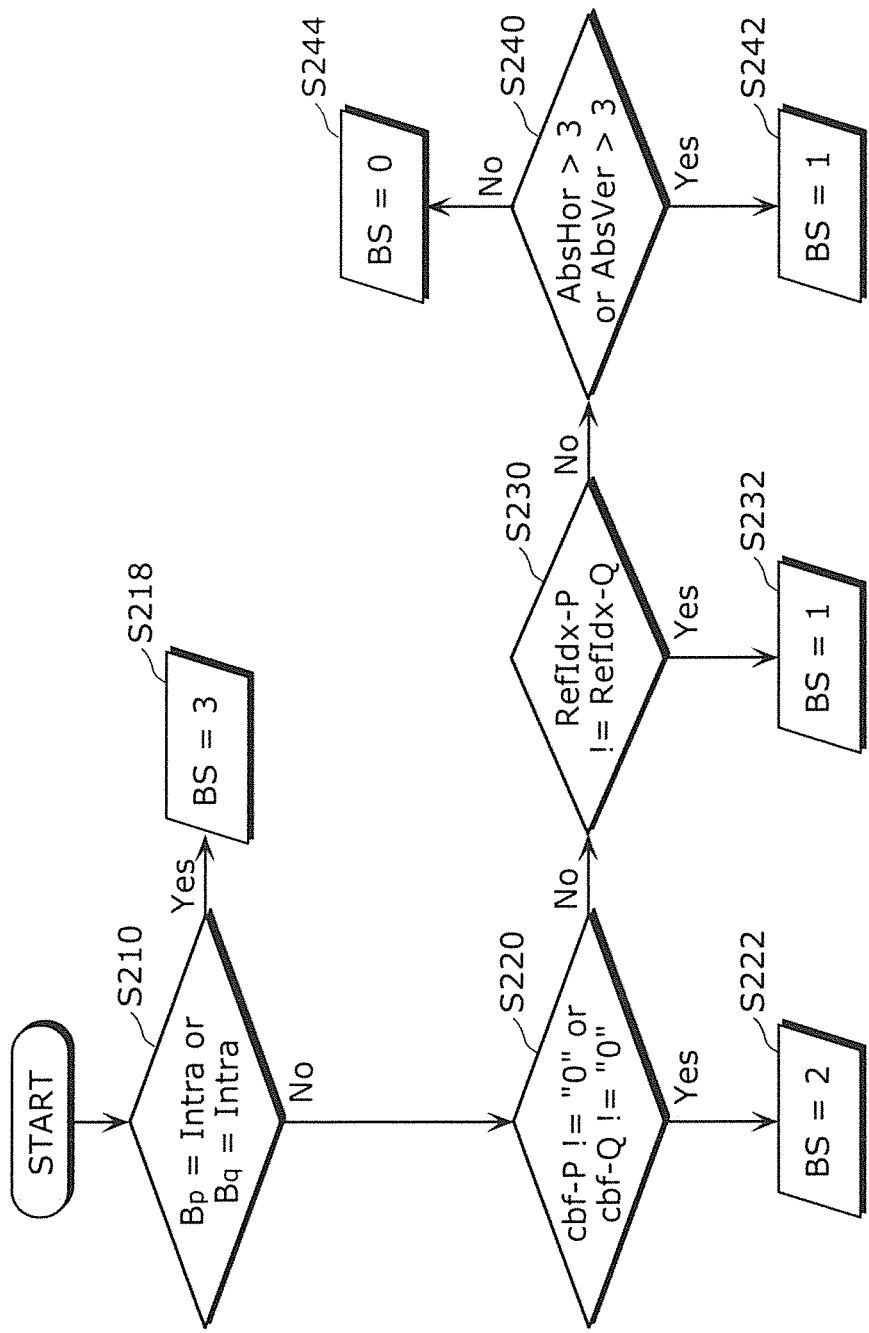
FIG. 13 is a flowchart showing processing procedures of steps of calculating boundary strengths BS in Variation 1.
Figure 15:
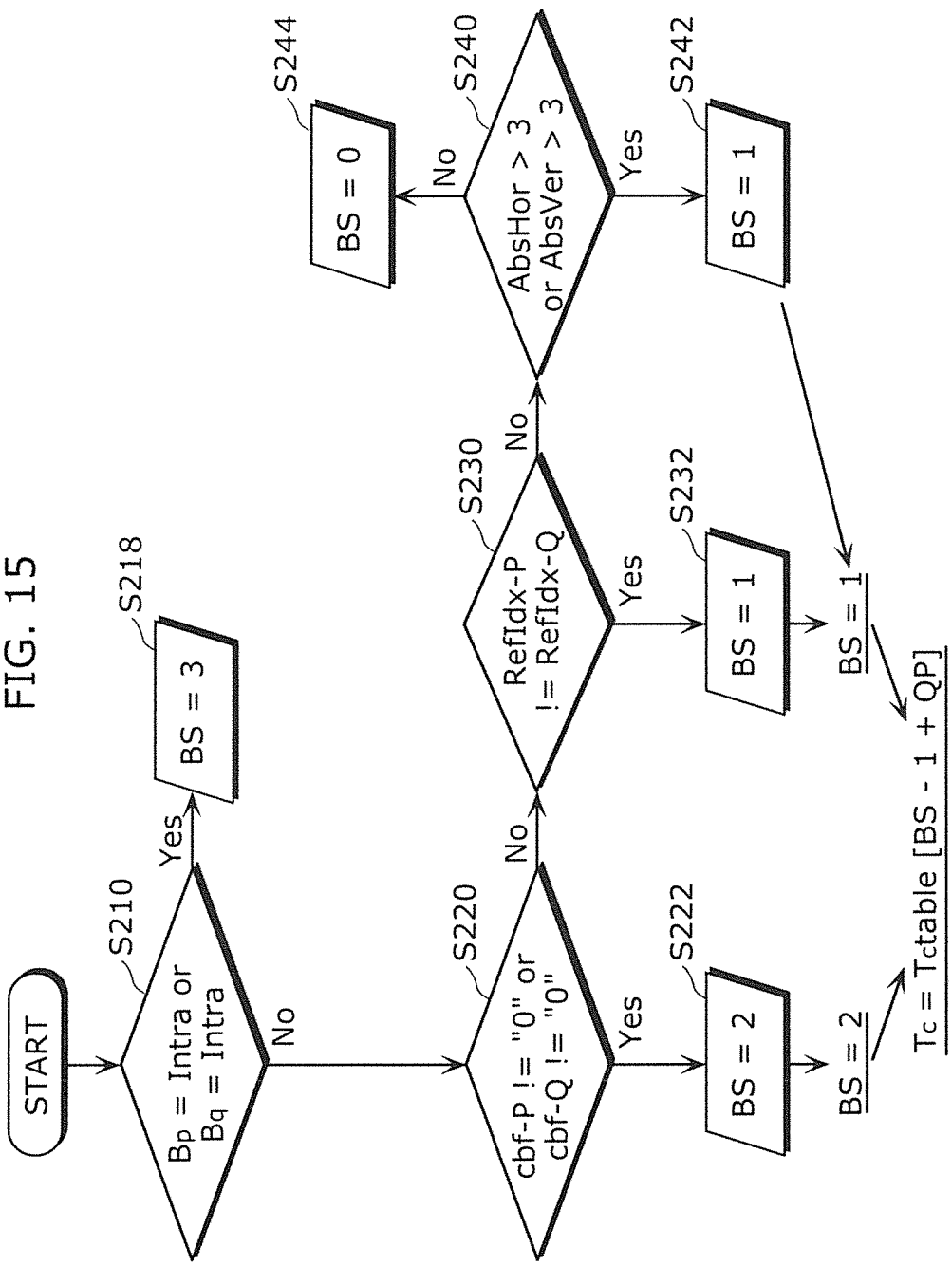
FIG. 15 is a diagram showing an exemplary set threshold value $t_c$ in Variation 1.

Variation 1 of this embodiment is described based on FIGS. 13 to 15.

Variation 1 describes a case where the steps (Step S100 in FIG. 7A) of calculating a boundary strength BS is different from the corresponding steps in the above embodiment.

FIG. 13 is a flowchart showing processing procedures of steps of calculating boundary strengths BS in this Variation.

As in Embodiment 1, the filter control unit 153 (FIG. 6) determines whether or not at least one of the blocks $B_P$ and $B_Q$ is an intra coded image in Step S210.

When it is determined that at least one of the blocks $B_P$ and $B_Q$ is an intra coded image (YES in Step S210), the filter control unit 153 sets 3 as the value of the boundary strength BS (S218). It is to be noted that the value of the boundary strength BS in Step S218 is not limited to 3, and any value is possible as long as the value is larger than the value of the boundary strength BS that is set in another Step.

The same processing as in Embodiment 1 is performed when it is determined in Step S210 that the blocks $B_P$ and $B_Q$ are not an intra coded image (NO in Step S210).

Here, FIG. 14 is a comparison diagram between the coding efficiencies (the right side in the diagram) in Variation 1 shown in FIG. 13 as shown in Non-patent Literature 2 and the coding efficiencies (the left side in the diagram) in the comparison example shown in FIG. 5.

As shown in FIG. 14, the coding efficiencies are approximately the same as in the coding efficiencies in the comparison example. However, as described above, it is possible to reduce the processing load and increase the processing efficiency.

A scheme for setting a threshold value $t_c$ in Variation 1 is described. In Variation 1, the threshold value $t_c$ is calculated according to Expression 24 using a lookup table function Tctable.

[Math. 24]

$$t_c = \text{Tctable}[BS-1+QP] \quad \text{(Expression 24)}$$

FIG. 15 is a diagram showing the threshold value $t_c$ that is set in this Variation. As shown in FIG. 14, also in this Variation 1, different threshold values $t_c$ are assigned to different boundary strengths BS.

In Variation 1, as shown in FIG. 13, a) since no processing for checking whether or no a current edge is a CU edge is required, it is possible to reduce the processing load to be placed onto the moving picture coding apparatus 100. Furthermore, according to Expression 24, b) since no offset value $t_c\_$offset is used in the calculation of a threshold value $t_c$, the step of deriving the threshold value $t_c$ is simplified, and it is possible to reduce the processing load to be placed onto the moving picture coding apparatus 100.

[1.1.6 Determination of Tc Depending on BS Value (Variation 2)]

Figure 16:
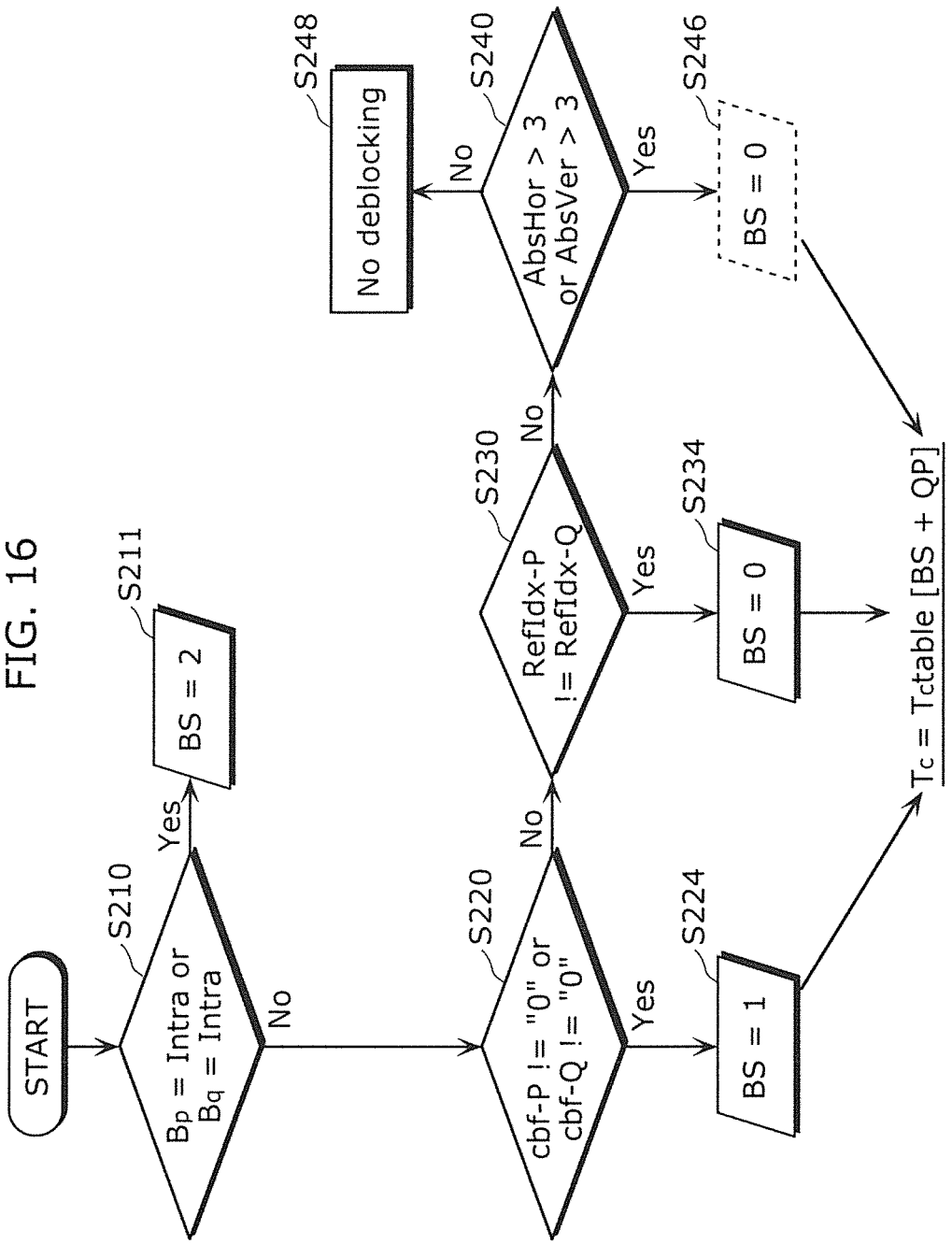
FIG. 16 is a diagram showing an exemplary set threshold value $t_c$ in Variation 2.

Variation 2 of this embodiment is described based on FIG. 16. Variation 2 describes a case where the procedures of steps of calculating the boundary strength BS are the same as the procedures in Variation 1, but the values of the boundary strengths BS to be set are different from the values in Variation 1. Accordingly, Variation 2 is different in the schemes for deriving the threshold values $t_c$ from Variation 1.

The values of the boundary strengths BS to be set in Variation 2 are described based on FIG. 16. In FIG. 16, the values of the boundary strengths to be set are smaller than the values of the boundary strengths in Variation 1.

More specifically, when it is determined in Step S210 that at least one of the blocks $B_P$ and $B_Q$ is an intra coded image (YES in Step S210), the value of the boundary strength BS is set to 2 (S211).

When it is determined in Step S220 that the value of at least one of a flag cbf-P and a flag cbf-Q is non-0 (YES in Step S220), the value of the boundary strength BS is set to 1 (S224).

When it is determined in Step S230 that a reference picture index RefIdx-P and a reference picture index RefId-Q are different (YES in S230), the value of the boundary strength BS is set to 1 (S234).

When, in Step S240, one of parameters AbsHor and AbsVer is larger than 3 (YES in S240), the value of the boundary strength BS is set to 0 (S246). On the other hand, when both the parameters AbsHor and AbsVer are determined to be smaller than or equal to 3 (NO in S240), the value of the boundary strength BS is set to 0 (S248).

A scheme for setting a threshold value $t_c$ in Variation 2 is described. In Variation 2, a lookup table function Tctable is used as in Variation 1, but schemes for calculating indices are different. In Variation 2, a threshold value $t_c$ is calculated according to Expression 25 below.

[Math. 25]

$$t_c = \text{Tctable}[BS+QP] \quad \text{(Expression 25)}$$

In Variation 2, a) no processing for checking whether or not a current edge is a CU edge is required and b) no offset value $t_c\_$offset is used in the calculation of the threshold value $t_c$ as in Variation 1. Thus, it is possible to reduce the processing load to be placed onto the moving picture coding apparatus 100.

[1.1.7 Determination of Tc Depending on BS Value (Variation 3)]

Variation 3 of this embodiment is described based on FIG. 17.

Variation 3 describes a case where the step (Step S100 in FIG. 7A) of calculating boundary strengths BS is different from the step in the above embodiment, Variation 1, and Variation 2.

FIG. 17 is a flowchart showing processing procedures of steps of calculating boundary strengths BS in this Variation.

In Step S210, the filter control unit 153 (FIG. 6) of the deblocking filtering unit 150 (FIG. 1 and FIG. 6) determines whether or not at least one of the blocks $B_P$ and $B_Q$ is an intra coded image, as in the above embodiment.

More specifically, when it is determined that at least one of the blocks $B_P$ and $B_Q$ is an intra coded image (YES in Step S210), the value of the boundary strength BS is set to 2 (S211).

When it is determined both in Step S210 that the blocks $B_P$ and $B_Q$ are determined not to be intra coded images (No in S210), it is determined whether or not one of the values of a flag cbf-P and a flag cbf-Q is non-0 (S220).

On the other hand, when one of the flag cbf-P and the flag cbf-Q is determined not to be 0 (NO in S220), a determination is made as to whether or not a reference picture index RefIdx-P of the block Bp and a reference picture index RefIdx-Q of the block $B_Q$ are different from each other (S230).

When it is determined in Step S230 that a reference picture index RefIdx-P and a reference picture index RefId-Q are different (YES in S230), the value of the boundary strength BS is set to 0 (S236).

On the other hand, when it is determined that the reference picture index RefIdx-P and the reference picture index RefIdx-Q are the same (NO in S230), whether or not one of a parameter AbsHor and AbsVer is larger than 3 is determined (S240).

When, it is determined in Step S240 that one of parameters AbsHor and AbsVer is larger than 3 (YES in S240), the value of the boundary strength BS is set to 0 (S246). On the other hand, when it is determined in Step S240 that the parameters AbsHor and AbsVer are smaller than or equal to 3 (NO in S240), no deblocking filtering is set (S248).

When it is determined in Step S220 that a flag cbf-P and a flag cbf-Q are 0 (YES in S220), a determination is made as to whether or not a reference picture index RefIdx-P of a block Bp and a reference picture index RefIdx-Q of a block $B_Q$ are different from each other (S250).

When it is determined in Step S250 that the reference picture index RefIdx-P of the block Bp and the reference picture index RefIdx-Q of the block $B_Q$ are the same (NO in S250), the value of the boundary strength BS is set to 1 (S252).

When it is determined in Step S250 that the reference picture index RefIdx-P and the reference picture index RefIdx-Q are different from each other, a determination is made as to whether or not one of the parameters AbsHor and AbsVer is larger than 3 (S260).

When it is determined in Step S260 that one of parameters AbsHor and AbsVer is larger than 3 (YES in S260), the value of the boundary strength BS is set to 2 (S264). When it is determined in Step S260 that both the parameters AbsHor and AbsVer are smaller than or equal to 3 (NO in S240), the value of the boundary strength BS is set to 1 (S262).

As shown in FIG. 17, Variation 3 makes it possible to perform additional steps of checking whether or not the reference indices are the same and making the determination based on the magnitude of the absolute difference between motion vectors even when it is determined in Step S220 that both the flag cbf-P and the flag cbf-Q are 0 (YES in S220), and to thereby set the values of the boundary strengths BS more precisely.

[1.1.8 Determination of Tc Depending on BS Value (Variation 4)]

Figure 18A:
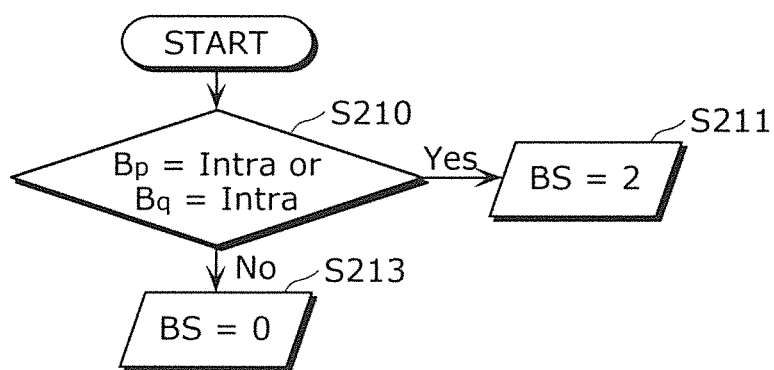
FIG. 18A is a diagram showing a processing procedure of steps of filtering in Variation 4.
Figure 18B:
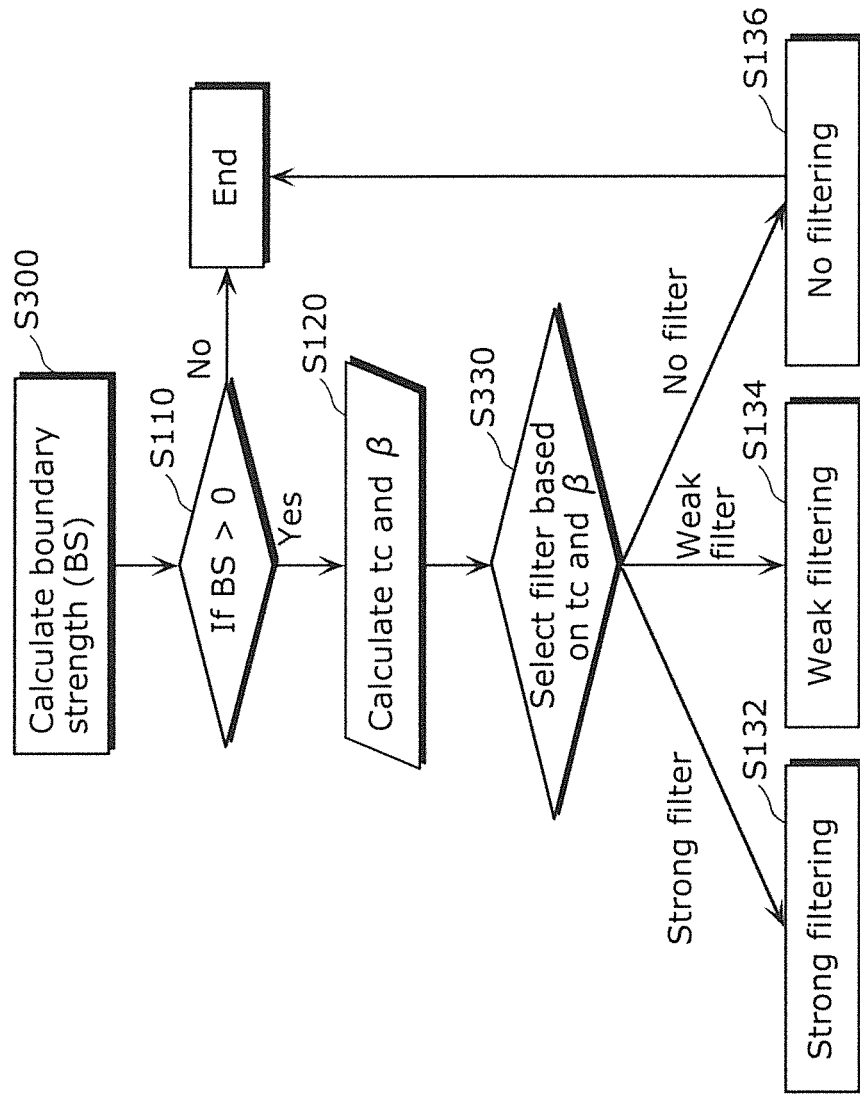
FIG. 18B is a diagram showing an exemplary set threshold value $t_c$ in Variation 4.

Variation 4 of this embodiment is described based on FIGS. 18A and 18B.

Variation 4 describes a case where the procedures of filtering processes and the procedures of calculating boundary strengths BS are different from those in the above embodiment and Variations 1 to 3.

FIG. 18A is a flowchart showing a processing procedure of filtering steps in Variation 4.

As shown in FIG. 18A, in Step S300, the filter control unit 153 calculates a boundary strength BS as a first parameter (a first parameter calculating step).

Here, FIG. 18B is a flowchart showing the procedures for setting boundary strengths BS. As shown in FIG. 18B, a determination is made as to whether or not at least one of blocks Bp and $B_Q$ is an intra coded image (S210). When it is determined that at least one of the blocks Bp and $B_Q$ is an intra coded image (YES in S210), the value of the boundary strength BS is set to 2 (S211). On the other hand, when it is determined that each of the blocks $B_P$ and $B_Q$ is not an intra coded image (NO in S210), the value of the boundary strength BS is set to 0 (S213). It is to be noted that another value is possible for the value to be set as the boundary strength BS.

In Step S120, the filter control unit 153 calculates a threshold value $t_c$ which defines an output range for a deblocking filter (a second parameter calculating step). Furthermore, in Step S120, the filter control unit 153 calculates a threshold value β for selecting a deblocking filter to be used.

In Step S330, the filter control unit 153 selects the deblocking filter based on the threshold value $t_c$ and the threshold value β (a selecting step).

When the strong filter is selected in Step S330, the first deblocking filter 151 performs strong filtering (S132). When the weak filter is selected in Step S330, the second deblocking filter 152 performs weak filtering (S134).

When no filtering is selected in Step S330, no filtering using a deblocking filter is not performed (S136).

In this variation, since the processing procedures of filtering processes and the procedures for calculating boundary strengths BS are simplified, it is possible to reduce the processing load to be placed onto a moving picture coding apparatus 100. Furthermore, it is possible to reduce the memory capacity to be used in the procedures for calculating the boundary strengths BS. In other words, since the possible values of the boundary strengths are 0 to 3, it is possible to represent each of the boundary strengths BS as 2-bit information. In this way, the advantageous effects of this variation are that the processing is performed using a smaller amount of memory capacity, and that the deblocking results are the same as the results obtainable in the current HM-4.0.

Embodiment 2

Figure 19:
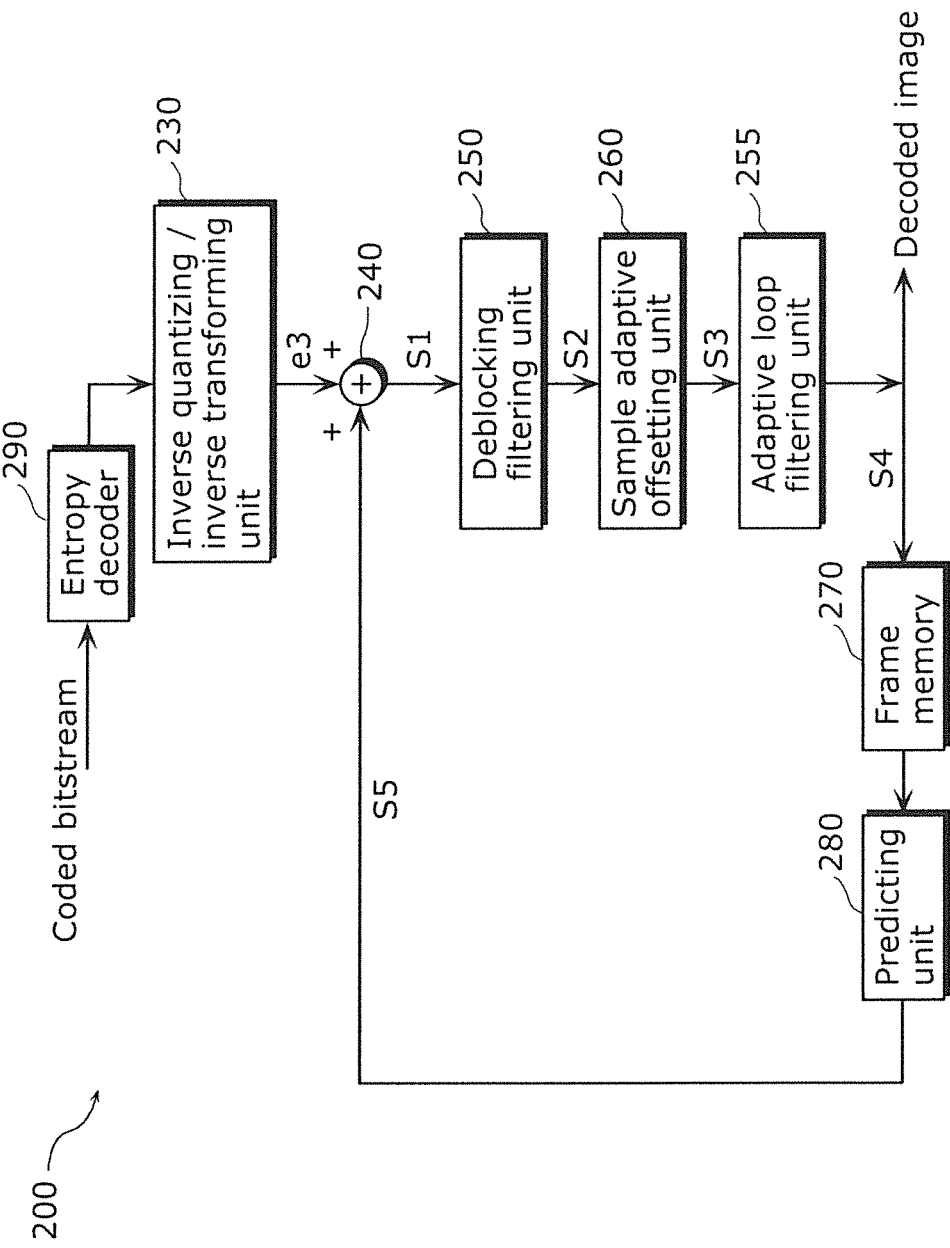
FIG. 19 is a block diagram showing an exemplary structure of a moving picture decoding apparatus according to Embodiment 2.

A moving picture decoding method and a moving picture decoding apparatus according to Embodiment 2 are described based on FIG. 19.

FIG. 19 is a block diagram showing an exemplary structure of a moving picture decoding apparatus which supports the H.264/MPEG-4AVC or the HEVC video coding standard.

As shown in FIG. 19, the moving picture decoding apparatus 200 includes an entropy decoder 290, an inverse quantizing/inverse transforming unit 230, an adder 240, a deblocking filtering unit 250, a sample adaptive offsetting unit 260, an adaptive loop filtering unit 255, a frame memory 270, and a predicting unit 280.

In FIG. 19, the entropy decoder 290 performs variable length decoding on an input coded bitstream to decode information necessary for decoding prediction modes etc. and quantized coefficients.

The inverse quantizing/inverse transforming unit 230 generates prediction error data e3 by performing inverse quantization on the quantized coefficients obtained through the variable length decoding, and by performing transform from a frequency domain to an image domain onto the quantized coefficients obtained through the inverse quantization.

The adder 240 generates a reconstructed image data (reconstructed image signal s1) by adding the prediction image data (a prediction image signal s5) and the prediction error data (the prediction error signal e3) already subjected to the inverse quantization and inverse transform by the inverse quantizing/inverse transforming unit 230.

The deblocking filtering unit 250 includes a plurality of deblocking filters having different strengths and a filter control unit which controls the plurality of deblocking filters (both are not shown in the drawings). The deblocking filtering unit 250 includes the plurality of deblocking filters corresponding in kind to the deblocking filters included in the moving picture coding apparatus 100. For example, the deblocking filtering unit 250 may include two kinds of deblocking filters for narrow bands and for wide bands, as in Embodiment 1. It is to be noted that the deblocking filtering unit 250 corresponds in structure to the deblocking filtering unit 150 in Embodiment 1.

The sample adaptive offsetting unit 260 performs, on a per pixel unit basis, a process of assigning an offset value for approximation to the original pixel values onto the reconstructed image data (reconstructed image signal s2) filtered by the deblocking filtering unit 250.

The adaptive loop filtering unit 255 includes an adaptive loop filter such as a Wiener filter, and performs a process of compensating image distortion due to compression onto the reconstructed image data (reconstructed image signal s3) output from the sample adaptive offsetting unit 260. The output image signal s4 from the adaptive loop filtering unit 255 is output as a decoded signal representing a decoded image.

The frame memory 270 stores, on a per frame basis, the reconstructed image data (reconstructed image signal s4) already subjected to the application of the adaptive loop filter.

The predicting unit 280 includes an intra predicting unit which performs spatial prediction (intra prediction) to generate a prediction image, and an inter predicting unit which performs temporal prediction (inter prediction) to generate a prediction image (the intra predicting unit and the inter predicting unit are not shown in the drawing). The predicting unit 280 can select the prediction type on a per frame basis or a per block basis.

Embodiment 3

Figure 20:
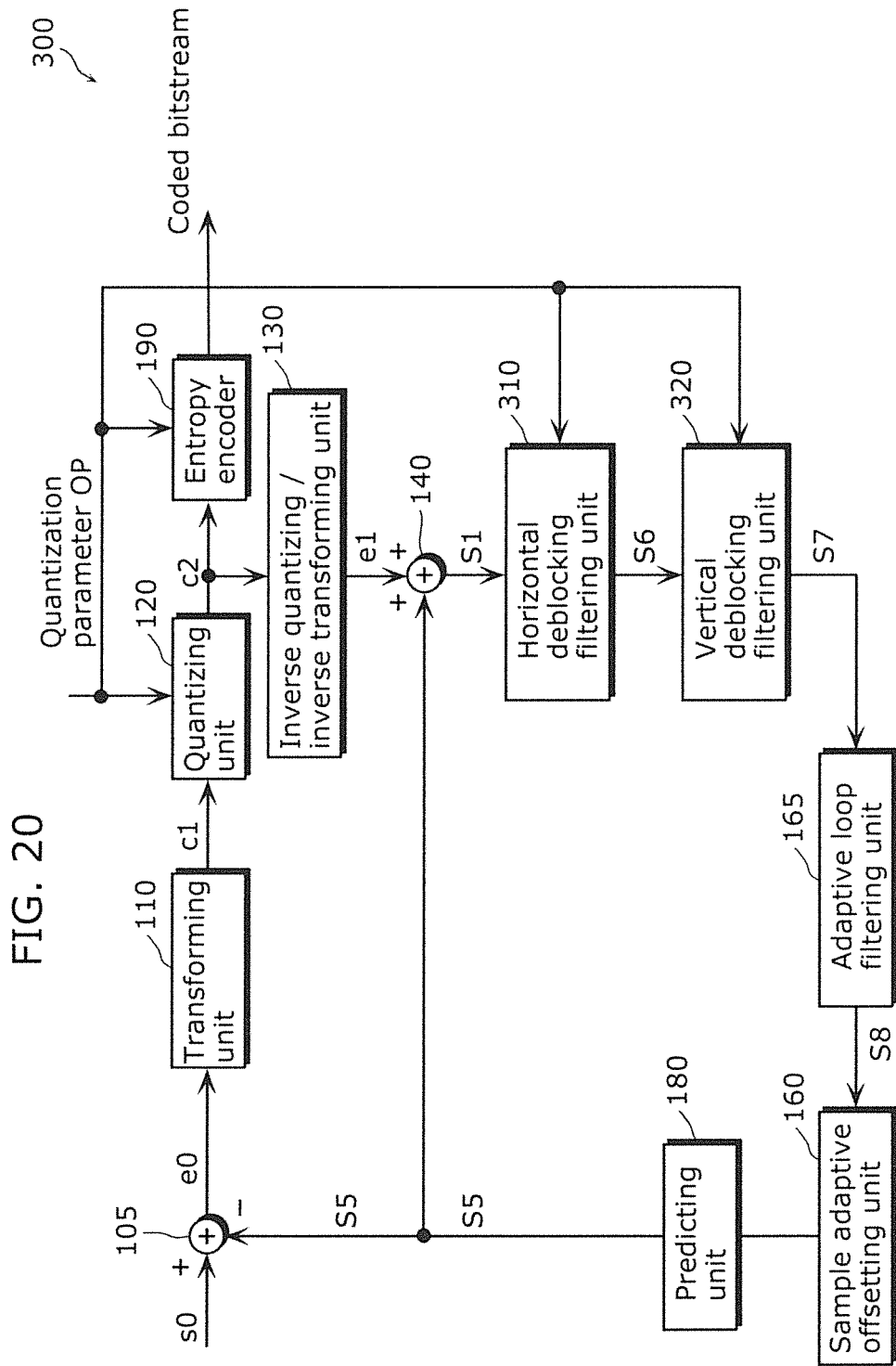
FIG. 20 is a block diagram showing an exemplary structure of a moving picture coding apparatus according to Embodiment 2.

A moving picture coding method and a moving picture coding apparatus according to Embodiment 3 are described based on FIG. 20.

FIG. 20 is a block diagram showing an exemplary structure of a moving picture coding apparatus (a hybrid video encoder) in this embodiment.

As shown in FIG. 20, the moving picture coding apparatus 300 includes a subtractor 105, a transforming unit 110, a quantizing unit 120, an inverse quantizing/inverse transforming unit 130, an adder 140, a horizontal deblocking filtering unit 310, a vertical deblocking filtering unit 320, an adaptive loop filtering unit 165, a sample adaptive offsetting unit 160, a predicting unit 180, and an entropy encoder 190.

Each of the subtractor 105, the transforming unit 110, the quantizing unit 120, the inverse quantizing/inverse transforming unit 130, the adder 140, the adaptive loop filtering unit 165, the sample adaptive offsetting unit 160, the predicting unit 180, and the entropy encoder 190 in this embodiment are the same in structure to the subtractor 105, the transforming unit 110, the quantizing unit 120, the inverse quantizing/inverse transforming unit 130, the adder 140, the adaptive loop filtering unit 165, the sample adaptive offsetting unit 155, the predicting unit 180, and the entropy encoder 190 in Embodiment 1 (comparison example), respectively.

The moving picture coding apparatus 300 in this embodiment is different from the moving picture coding apparatus 100 in Embodiment 1 in the point that the deblocking filtering unit 150 shown in FIG. 1 is divided to (i) a horizontal deblocking filtering unit 310 which executes filtering on vertical edges and (ii) a vertical deblocking filtering unit 320 which executes filtering on horizontal edges.

It is to be noted that, in this embodiment, the horizontal deblocking filtering unit 310 generates a reconstructed signal s6 by executing filtering onto a vertical edge represented by a reconstructed signal s1 output from the adder 140. In addition, the vertical deblocking filtering unit 320 executes filtering onto a horizontal edge represented by a reconstructed signal s6.

It is to be noted that, FIG. 20 shows that a quantization parameter QP is input to the entropy encoder 190, the horizontal deblocking filtering unit 310, and the vertical deblocking filtering unit 320.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 21:
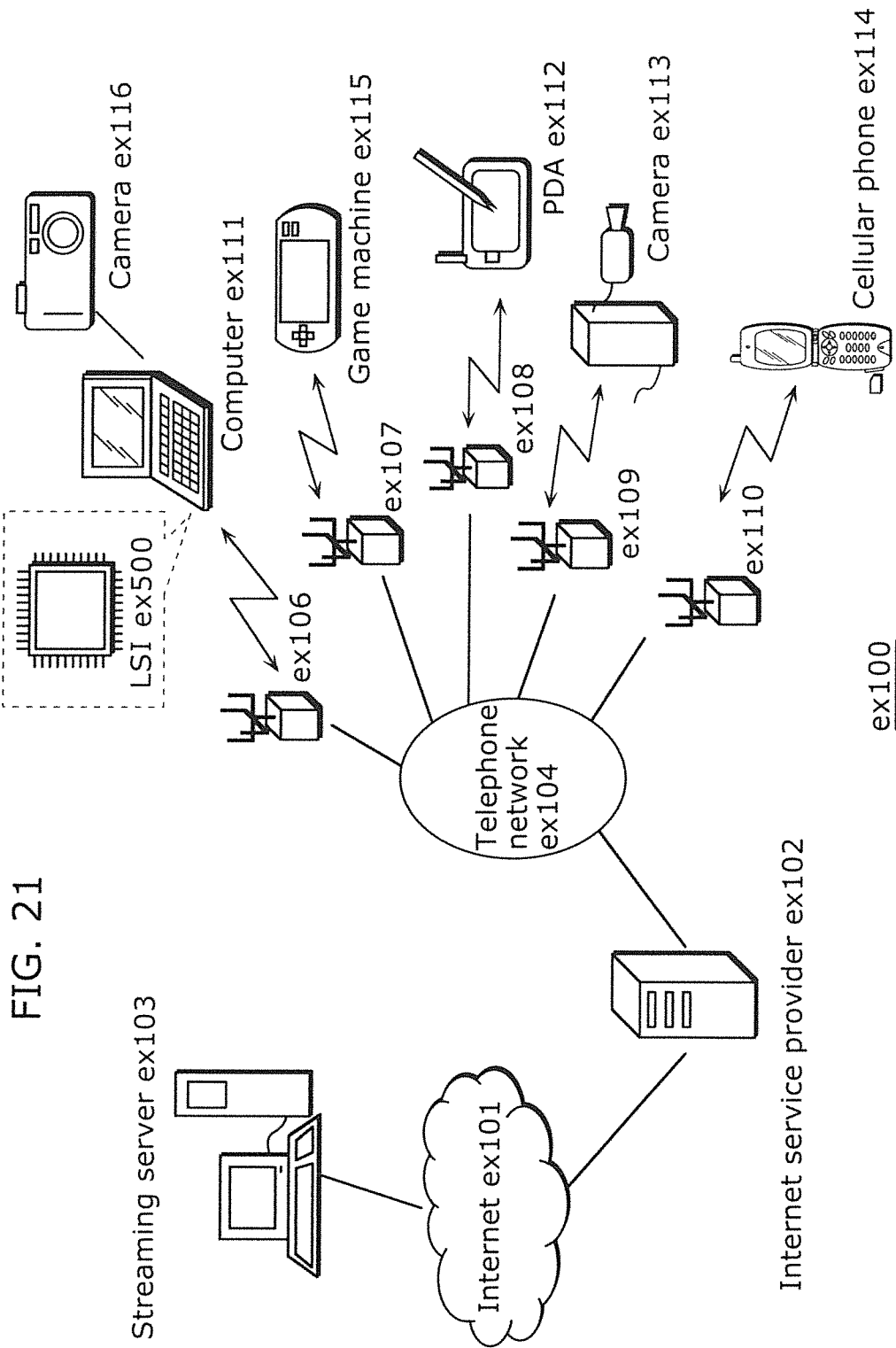
FIG. 21 shows an overall configuration of a content providing system for implementing content distribution services.

FIG. 21 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 21, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 22:
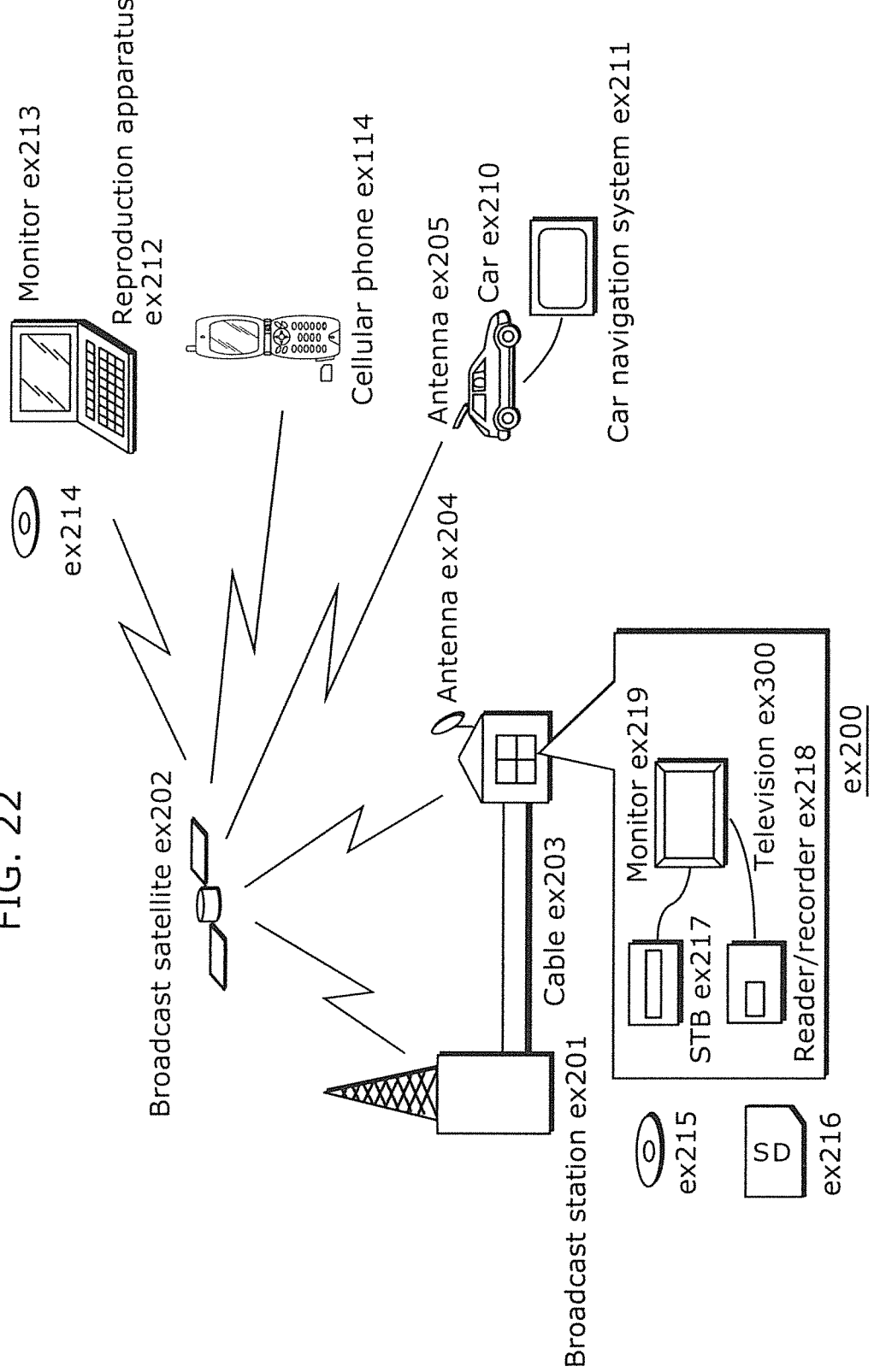
FIG. 22 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 22. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 23:
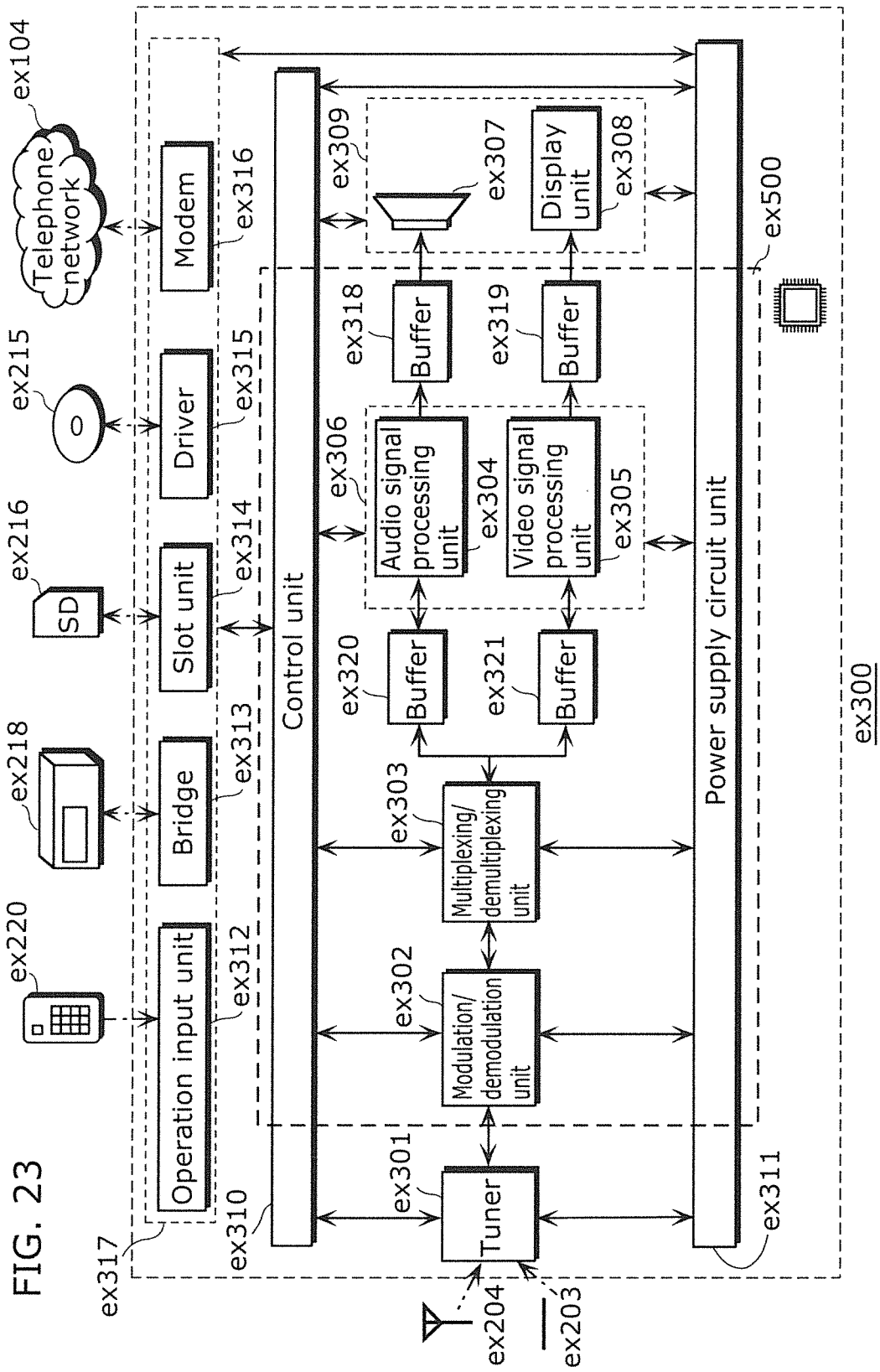
FIG. 23 shows a block diagram illustrating an example of a configuration of a television.

FIG. 23 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 24:
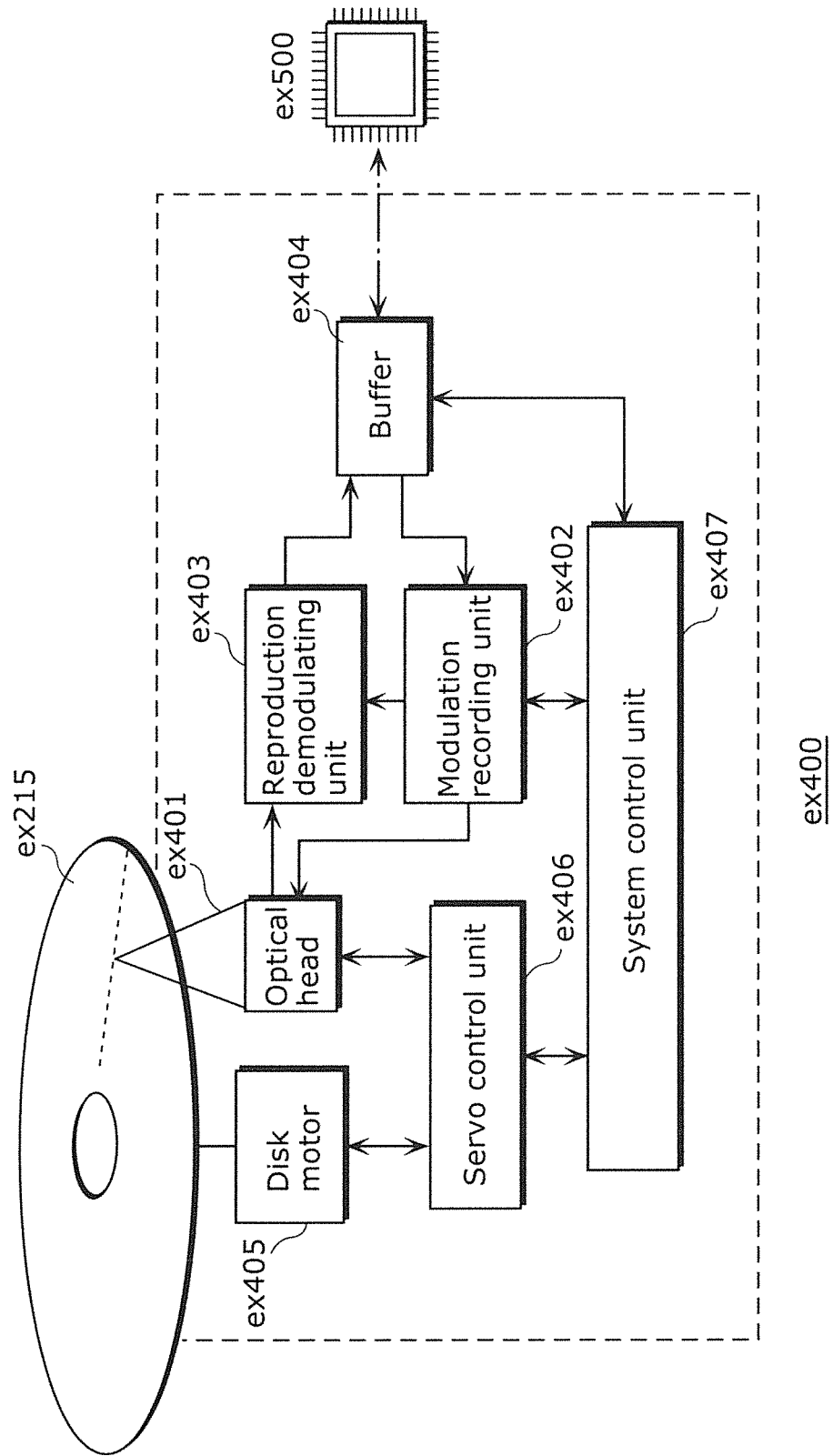
FIG. 24 shows a block diagram illustrating an example of a configuration of an information reproducing/recording unit that reads and writes information from and on a recording medium that is an optical disk.

As an example, FIG. 24 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 25:
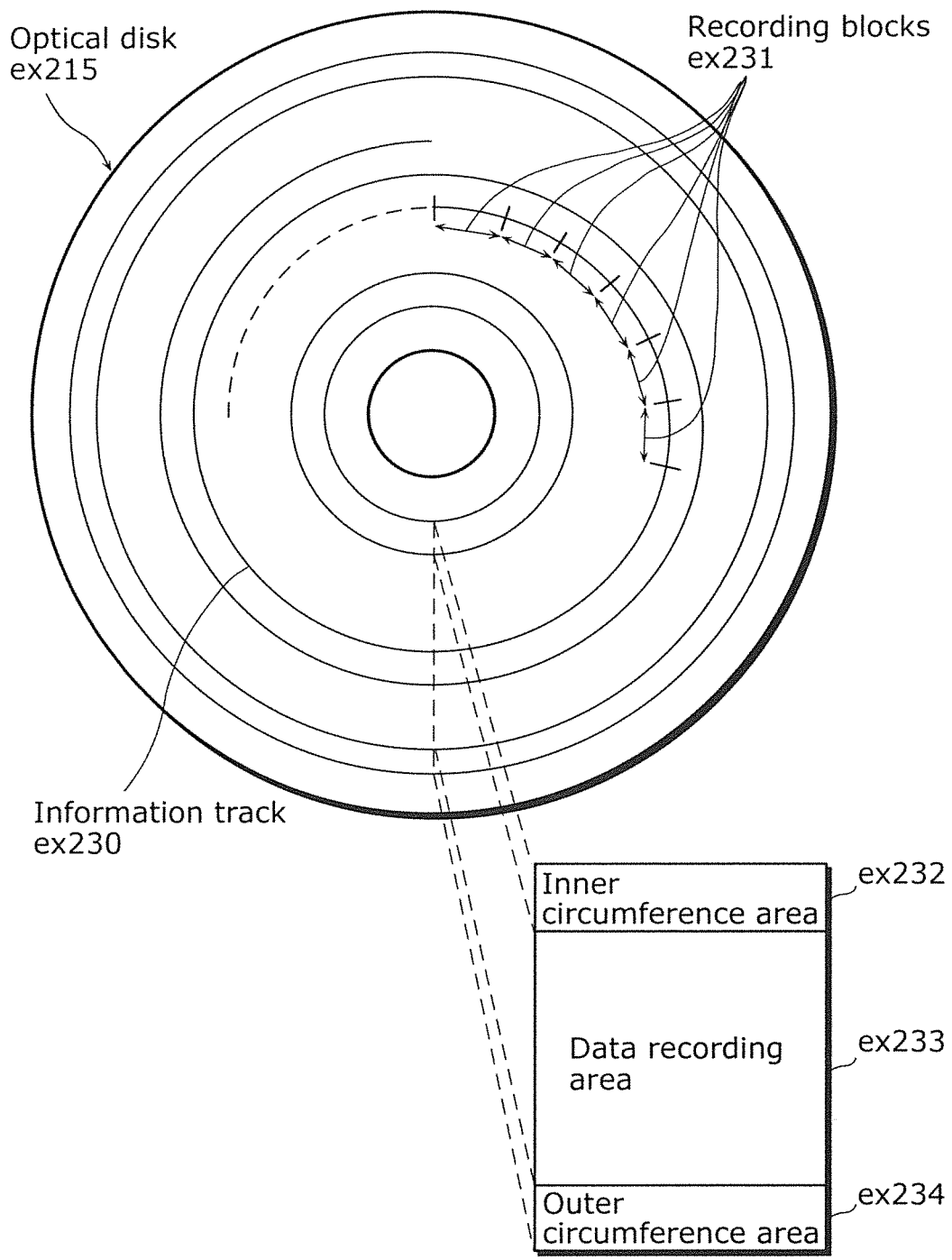
FIG. 25 shows an example of a configuration of a recording medium that is an optical disk.

FIG. 25 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 23. The same will be true for the configuration of the computer ex111, the cellular phone ex114, and others.

Figure 26A:
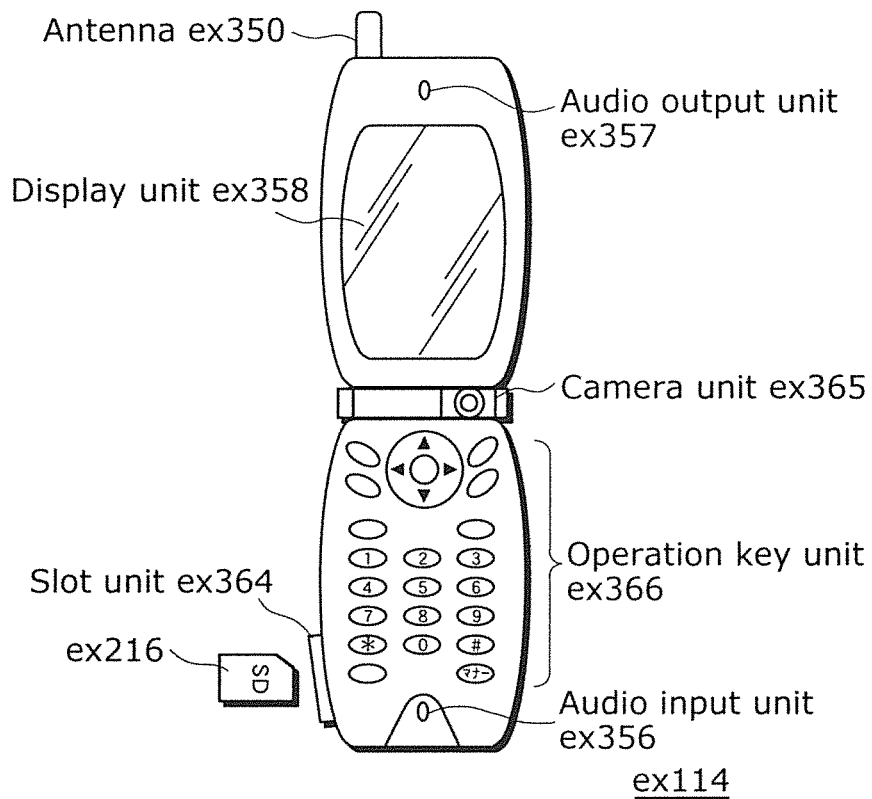
FIG. 26A shows an example of a cellular phone.

FIG. 26A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 26B:
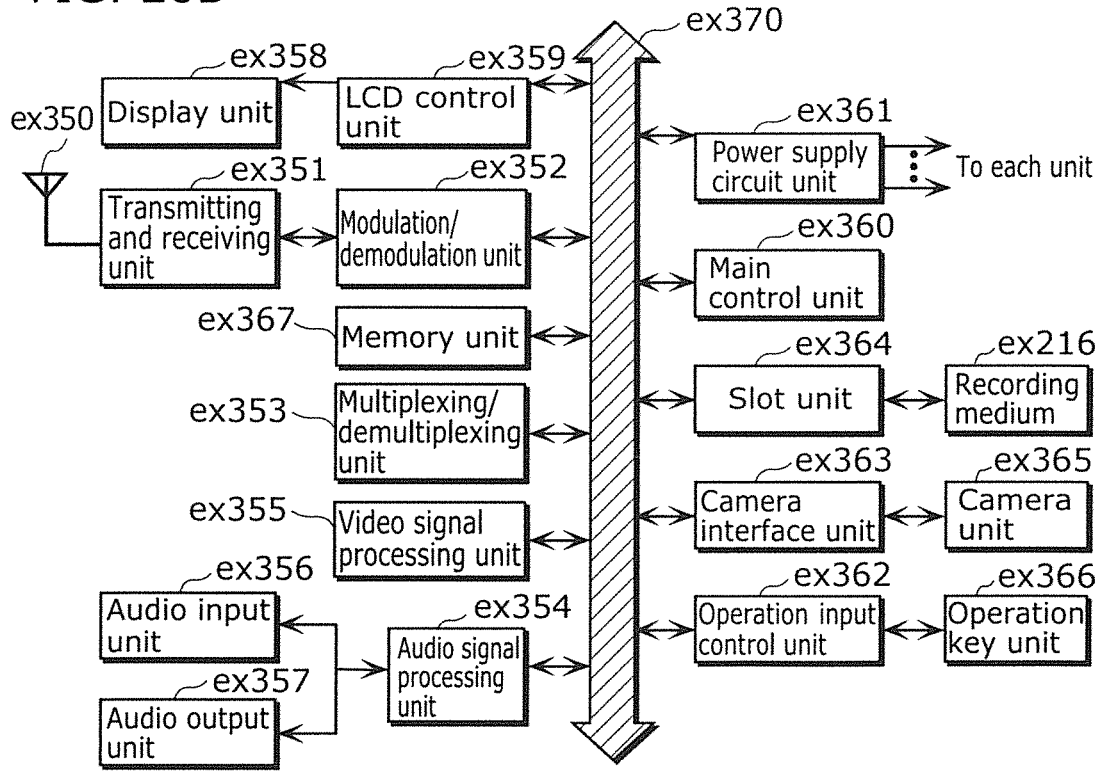
FIG. 26B is a block diagram showing an example of a configuration of a cellular phone.

Next, an example of a configuration of the cellular phone ex114 will be described with reference to FIG. 26B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

The present disclosure is not limited to the above embodiments, and various modifications and revisions can be made without deviating from the scope of the present disclosure.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 27:
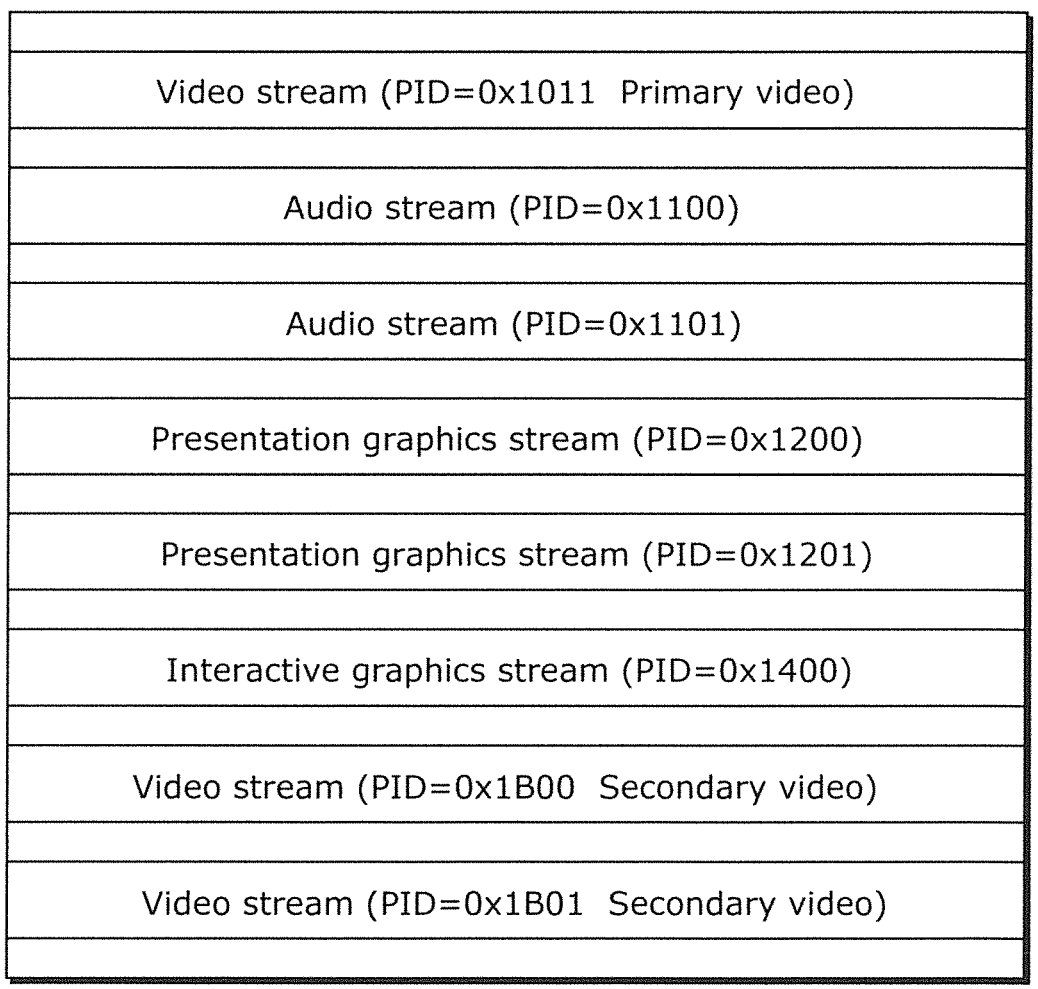
FIG. 27 illustrates a structure of multiplexed data.

FIG. 27 illustrates a structure of the multiplexed data. As illustrated in FIG. 27, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 28:
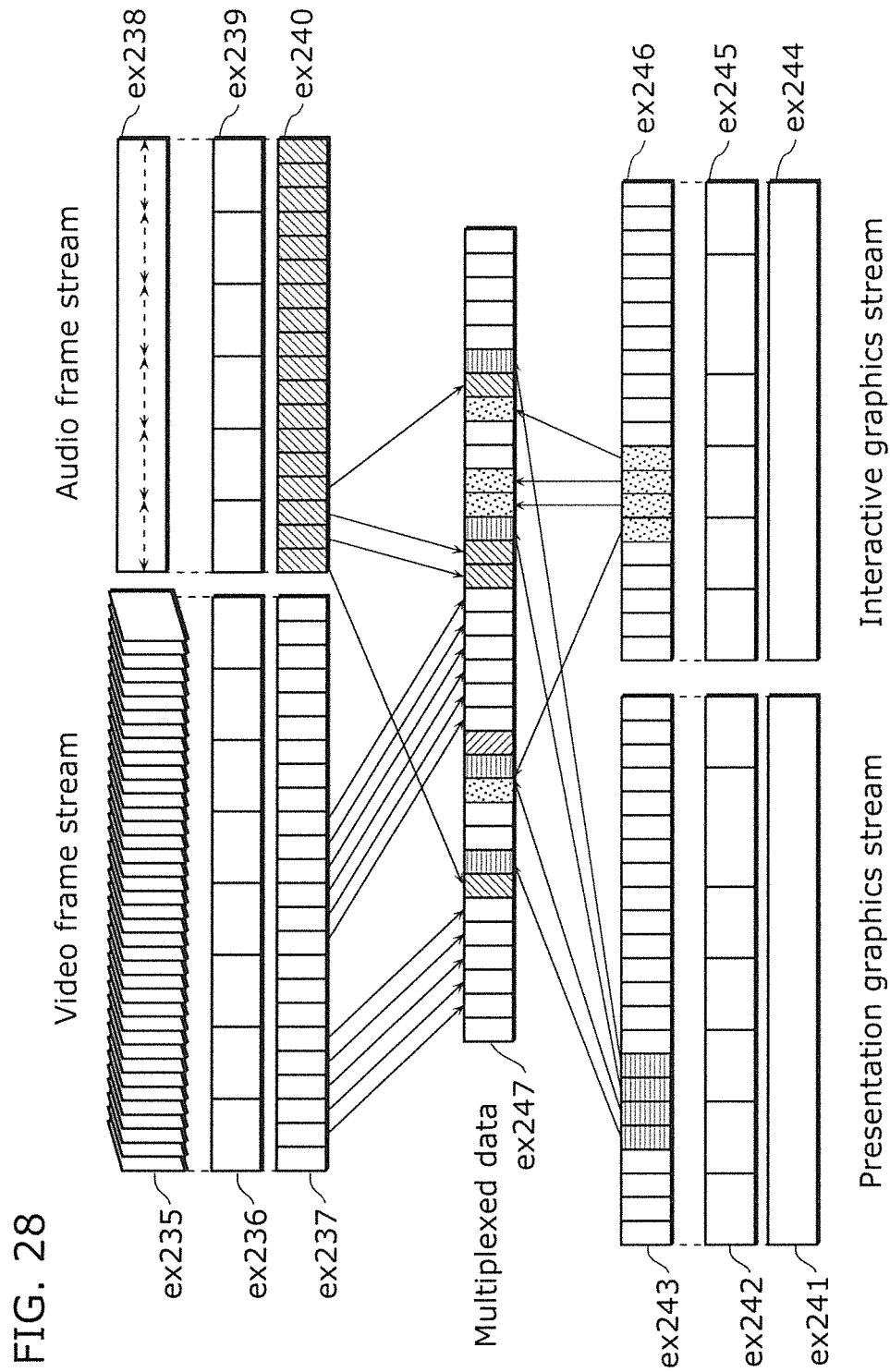
FIG. 28 schematically shows how each stream is multiplexed in multiplexed data.

FIG. 28 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 29:
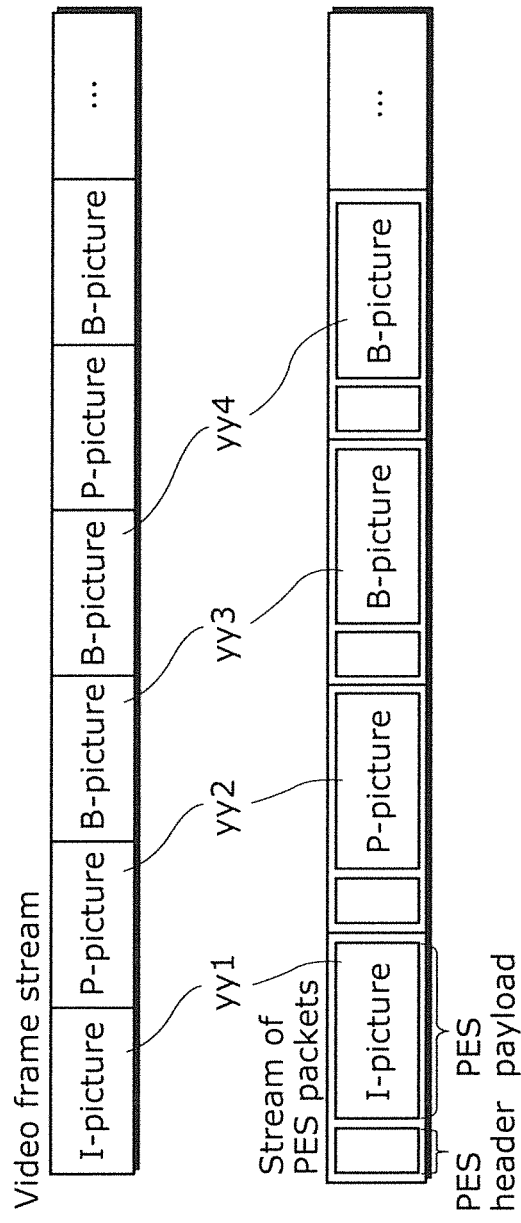
FIG. 29 shows how a video stream is stored in a stream of PES packets in more detail.

FIG. 29 illustrates how a video stream is stored in a stream of PES packets in more detail. The first bar in FIG. 29 shows a video frame stream in a video stream. The second bar shows the stream of PES packets. As indicated by arrows denoted as yy1, yy2, yy3, and yy4 in FIG. 29, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 30 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 30. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 31:
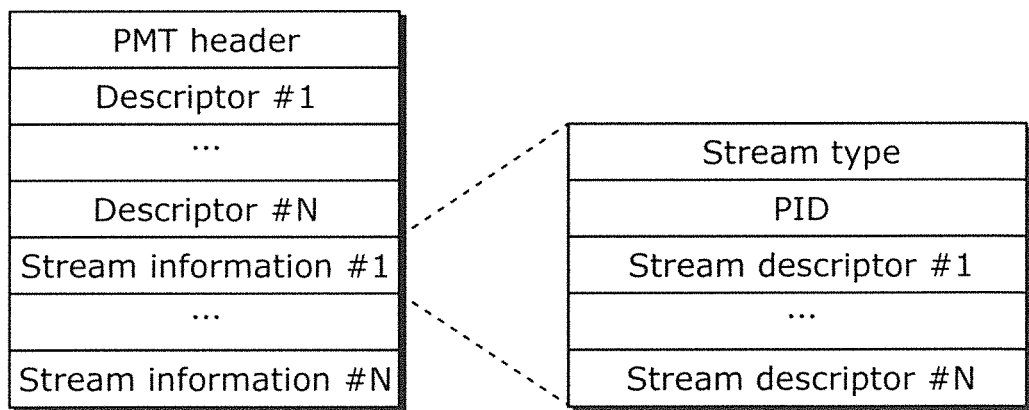
FIG. 31 shows a data structure of a PMT.

FIG. 31 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 32:
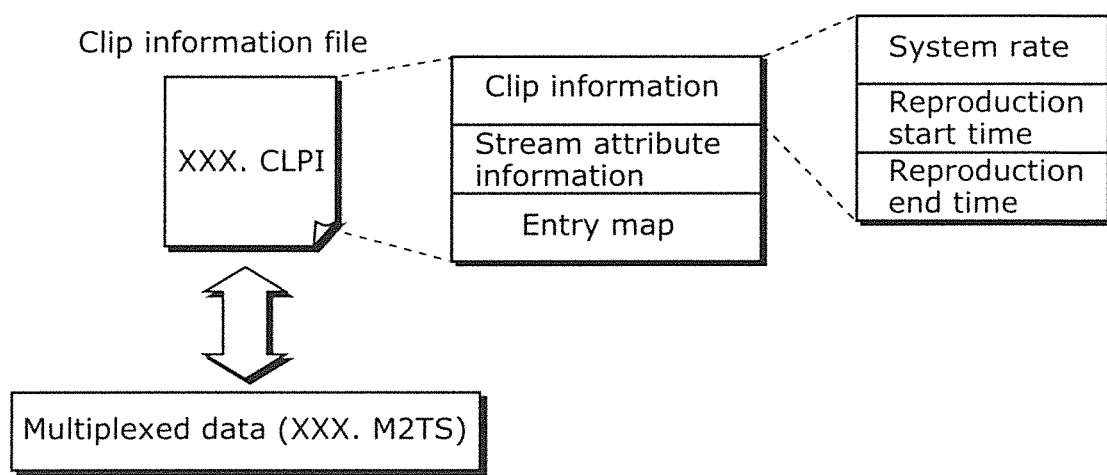
FIG. 32 shows an internal structure of multiplexed data information.

Each of the multiplexed data information files is management information of the multiplexed data as shown in FIG. 32. The multiplexed data information files are in one to one correspondence with the multiplexed data, and each of the files includes multiplexed data information, stream attribute information, and an entry map.

As illustrated in FIG. 32, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 33:
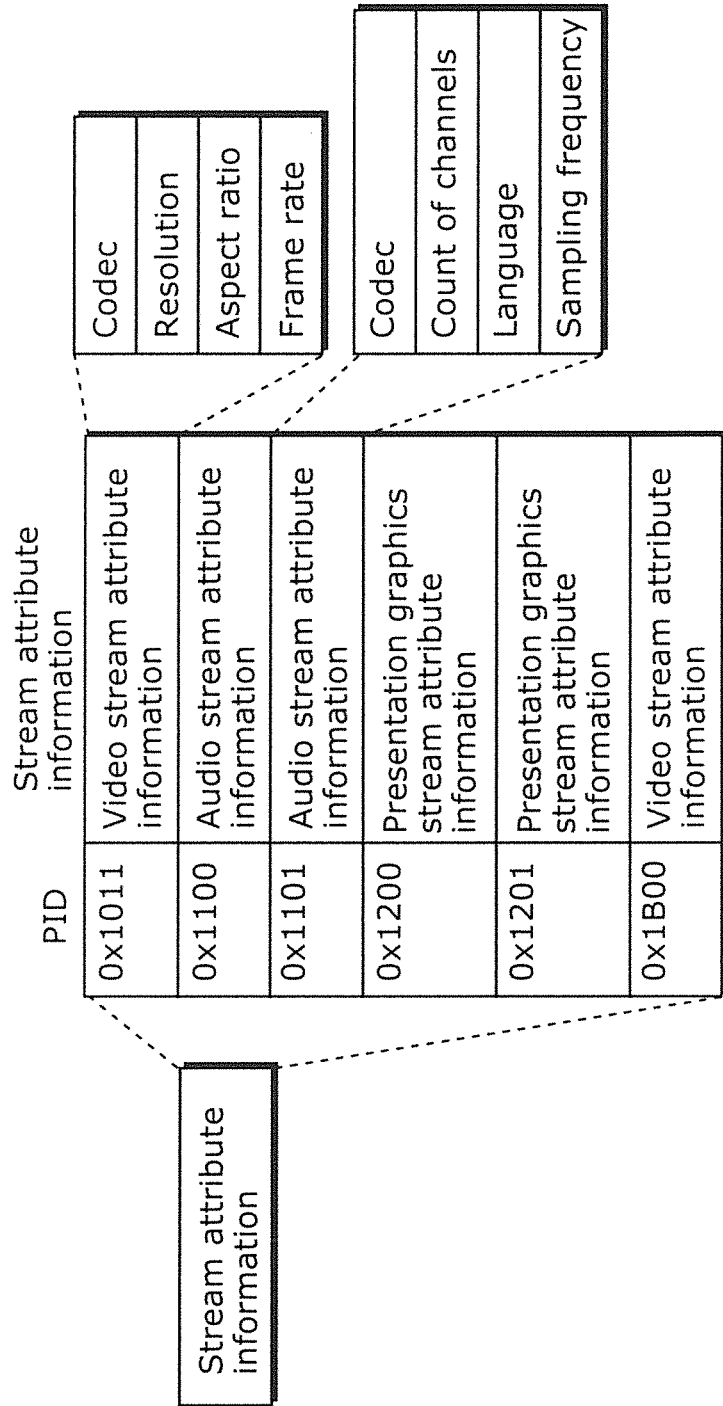
FIG. 33 shows an internal structure of stream attribute information.

As shown in FIG. 33, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 34:
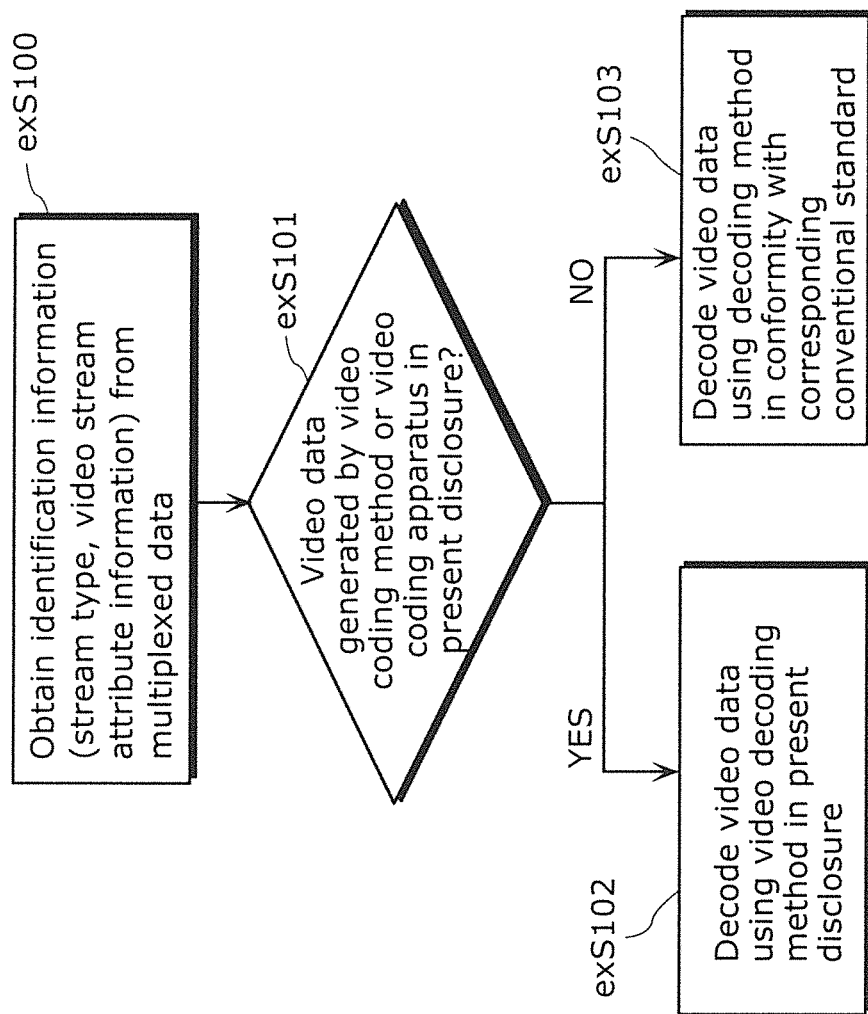
FIG. 34 shows steps for identifying video data.

Furthermore, FIG. 34 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Figure 35:
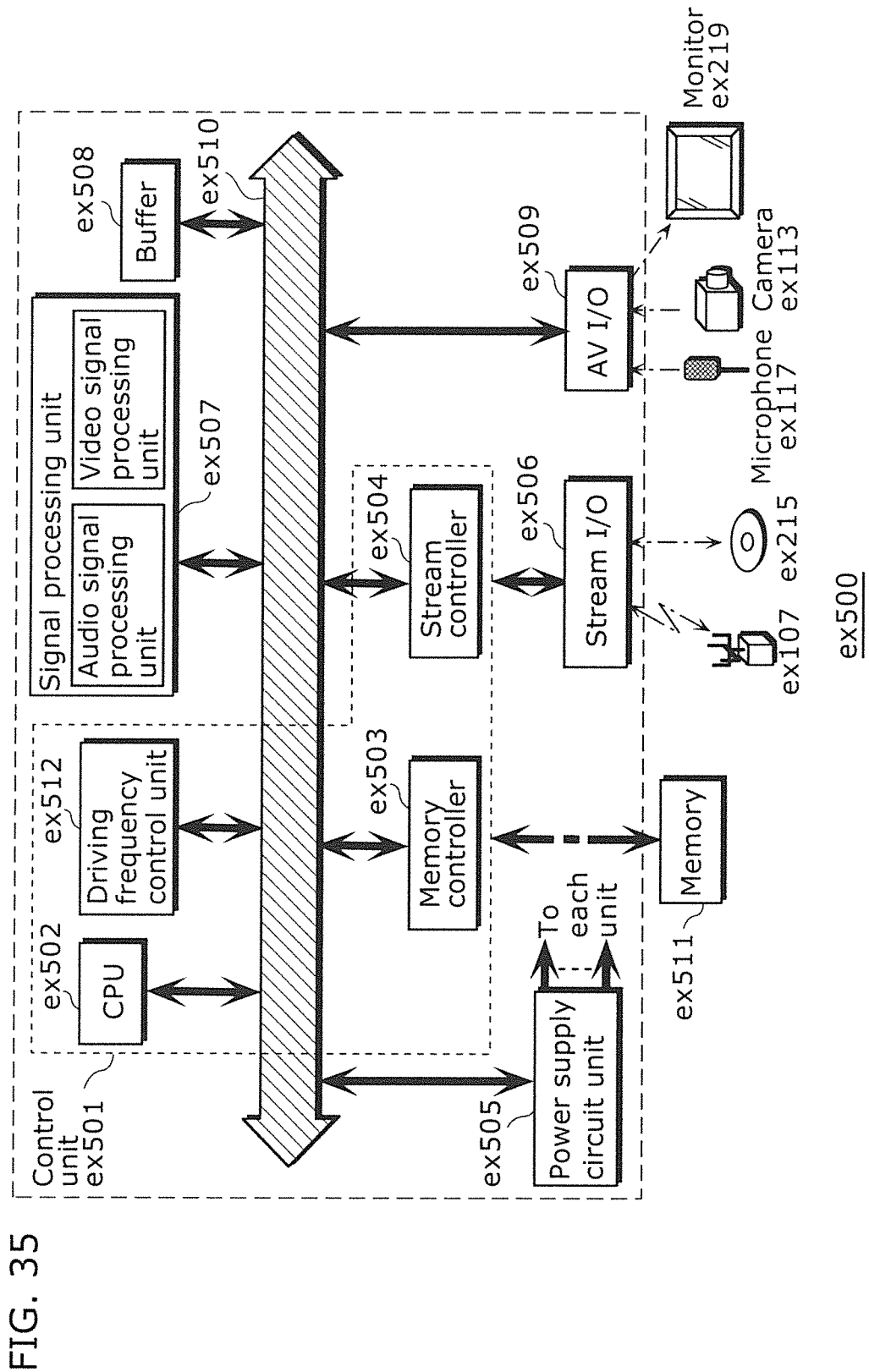
FIG. 35 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 35 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 36:
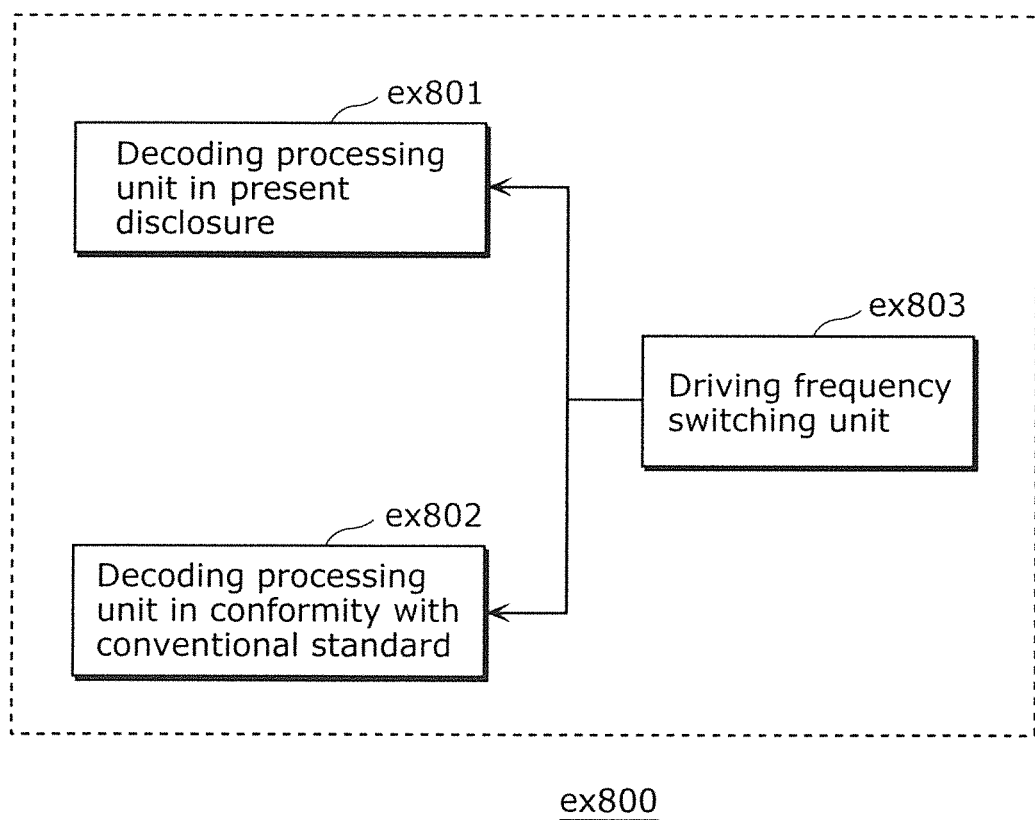
FIG. 36 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 36 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 35. Here, each of the decoding processing unit ex801 that executes the moving picture decoding method described in each of embodiments and the decoding processing unit ex802 that conforms to the conventional standard corresponds to the signal processing unit ex507 in FIG. 35. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 38. The driving frequency can be selected by storing the look-up table in the buffer ex508 and in an internal memory of an LSI, and with reference to the look-up table by the CPU ex502.

Figure 37:
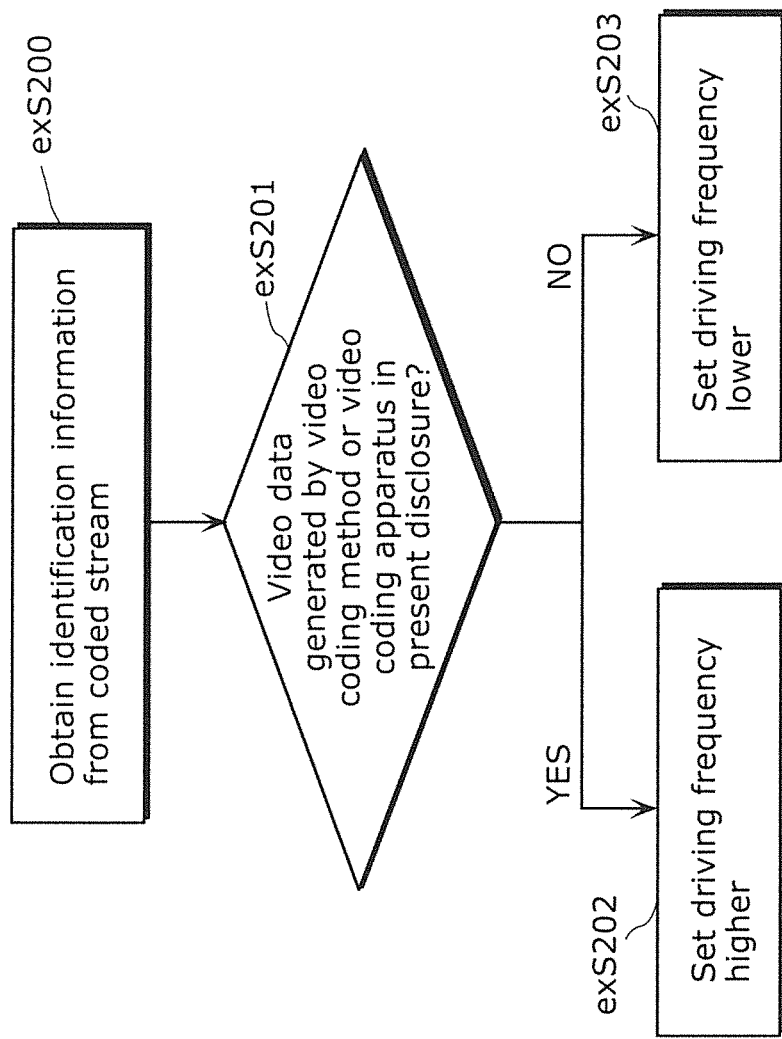
FIG. 37 shows steps for identifying video data and switching between driving frequencies.

FIG. 37 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 39A:
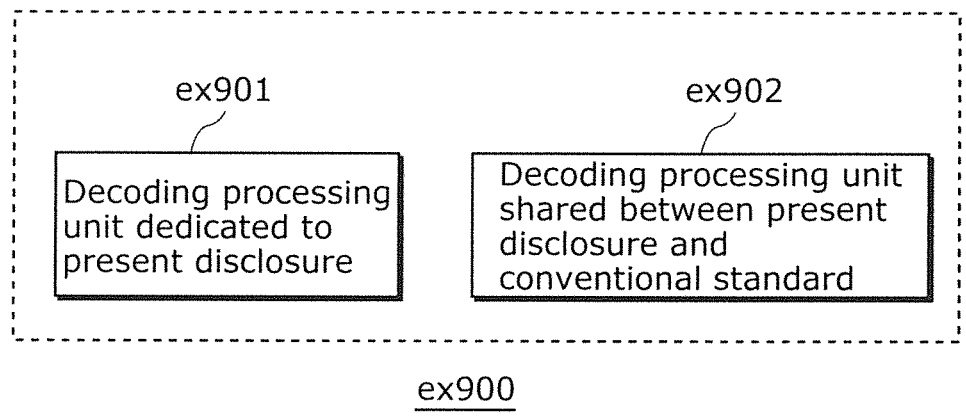
FIG. 39A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 39A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. The decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 39B:
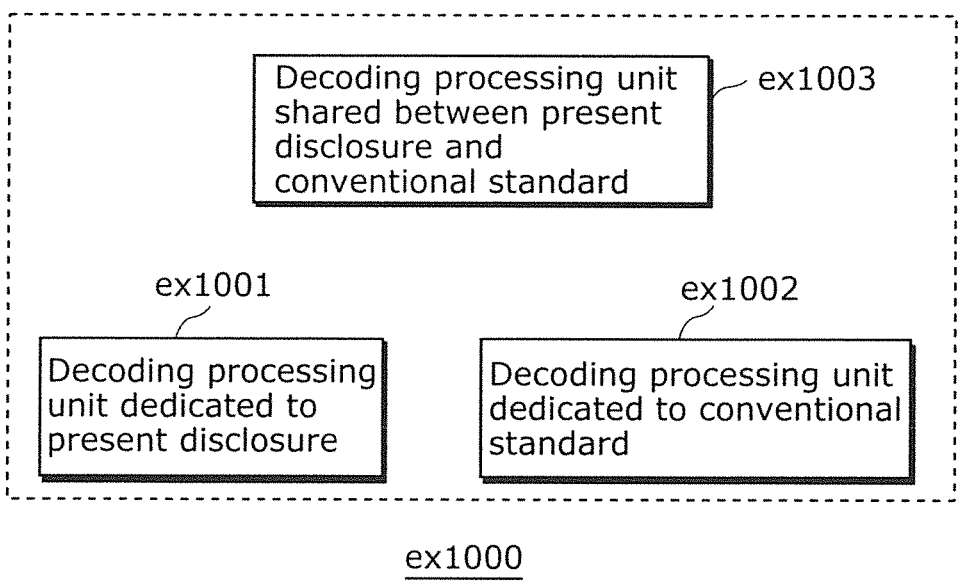
FIG. 39B is a diagram showing another example of a configuration for sharing a module of the signal processing unit.

Furthermore, ex1000 in FIG. 39B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

An image processing method according to this disclosure is applicable to compression decoding of various multimedia data. The image processing method according to this disclosure is useful as compression decoding processes in storage, transmission, communication, and the like using, for example, mobile phones, DVD devices, personal computers.

The invention claimed is:
1. An image processing method, comprising:
deriving a boundary strength of a boundary between two adjacent image blocks;
deriving a quantization parameter regarding quantization of the two adjacent image blocks;

calculating one index using a linear sum of the boundary strength and the quantization parameter;
deriving a threshold value associated with the one index in a table, with reference to the table using the one index;
selecting a deblocking filter from among a plurality of deblocking filters using the threshold value; and
applying the deblocking filter to the boundary between the two adjacent image blocks.

2. An image processing apparatus, comprising:
circuitry; and
memory connected to the circuitry,
wherein, in operation, the circuitry:
derives a boundary strength of a boundary between two adjacent image blocks;
derives a quantization parameter regarding quantization of the two adjacent image blocks;
calculates one index using a linear sum of the boundary strength and the quantization parameter;
derives a threshold value associated with the one index in a table, with reference to the table using the one index;
selects a deblocking filter from among a plurality of deblocking filters using the threshold value; and
applies the deblocking filter to the boundary between the two adjacent image blocks.

* * * * *